United States Patent
Kawasaki

(10) Patent No.: US 11,209,921 B2
(45) Date of Patent: Dec. 28, 2021

(54) ELECTRONIC BLACKBOARD, STORAGE MEDIUM, AND INFORMATION DISPLAY METHOD

(71) Applicant: Yuichi Kawasaki, Kanagawa (JP)

(72) Inventor: Yuichi Kawasaki, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 597 days.

(21) Appl. No.: 15/919,699

(22) Filed: Mar. 13, 2018

(65) Prior Publication Data

US 2018/0203566 A1 Jul. 19, 2018

Related U.S. Application Data

(63) Continuation of application No. PCT/JP2016/078915, filed on Sep. 29, 2016.

(30) Foreign Application Priority Data

Sep. 30, 2015 (JP) .............................. JP2015-194991

(51) Int. Cl.
*G06F 3/041* (2006.01)
*G06F 3/0488* (2013.01)
*G06F 3/0484* (2013.01)

(52) U.S. Cl.
CPC ............ *G06F 3/041* (2013.01); *G06F 3/0488* (2013.01); *G06F 3/04845* (2013.01); *G06F 3/04883* (2013.01)

(58) Field of Classification Search
CPC ...... G06F 3/041; G06F 3/0416; G06F 3/0488; G06F 3/04883; G06F 3/04845; G06F 3/017; G06F 2203/04808
(Continued)

(56) References Cited

U.S. PATENT DOCUMENTS 8,907,907 B2 12/2014 Kawasaki et al.
9,088,678 B2 7/2015 Komaba et al.
(Continued)

FOREIGN PATENT DOCUMENTS

CN 103513865 1/2014
JP H08-314619 11/1996
(Continued)

OTHER PUBLICATIONS

Machined English Translation for JP 2014-146127A; Aug. 20, 2020; pp. 1-23 (Year: 2020).*
(Continued)

*Primary Examiner* — Jimmy H Nguyen
(74) *Attorney, Agent, or Firm* — IPUSA, PLLC

(57) ABSTRACT

An electronic blackboard includes a display that displays visible information. The electronic blackboard includes a coordinate detector configured to detect coordinates of an object in the display; a number detector configured to detect a number of the objects in the display, based on the detected coordinates of the object; a time measurer configured to start measuring a predetermined time in response to detecting a first object; and a mode determiner configured to determine that the electronic blackboard is in a handwriting mode in which the visible information is displayed based on the coordinates, upon determining that a second object is not detected upon completing to measure the predetermined time, and to determine that the electronic blackboard is in a gesture mode in which an operation with respect to the visible information is accepted, upon determining that the second object is detected before completing to measure the predetermined time.

13 Claims, 30 Drawing Sheets

(58) Field of Classification Search
USPC .................................................. 345/173–175
See application file for complete search history.

(56) References Cited

U.S. PATENT DOCUMENTS

| | | | | |
|---|---|---|---|---|
| 2012/0218203 A1* | 8/2012 | Kanki | ................... | G06F 3/0416 |
| | | | | 345/173 |
| 2013/0179844 A1 | 7/2013 | Mandic et al. | | |
| 2014/0098402 A1* | 4/2014 | Komaba | ............. | G06F 3/04817 |
| | | | | 358/1.15 |
| 2014/0146001 A1 | 5/2014 | Baba | | |
| 2015/0077369 A1 | 3/2015 | Nagahara et al. | | |
| 2015/0199124 A1 | 7/2015 | Kishimoto et al. | | |
| 2016/0041674 A1 | 2/2016 | Xia et al. | | |

FOREIGN PATENT DOCUMENTS

| | | |
|---|---|---|
| JP | 2003-196028 | 7/2003 |
| JP | 2003-248551 | 9/2003 |
| JP | 2011-022964 | 2/2011 |
| JP | 2012-168619 | 9/2012 |
| JP | 2012-190392 | 10/2012 |
| JP | 2013-012134 | 1/2013 |
| JP | 2014-078097 | 5/2014 |
| JP | 2014-106799 | 6/2014 |
| JP | 2014-146127 | 8/2014 |
| JP | 2015-503804 | 2/2015 |
| WO | 2014/108959 | 7/2014 |

OTHER PUBLICATIONS

Extended European Search Report for 16851800.9 dated Aug. 14, 2018.
International Search Report dated Nov. 1, 2016 in PCT/JP2016/078915 filed on Sep. 29, 2016.
Chinese Office Action for CN201680055185.3 dated Jun. 19, 2020.

\* cited by examiner

FIG.6
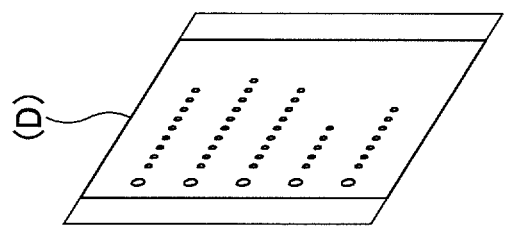
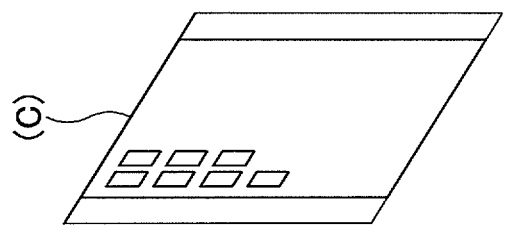
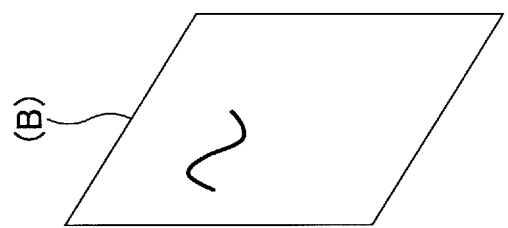
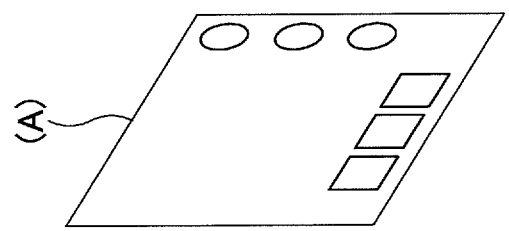
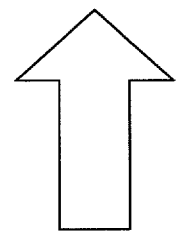
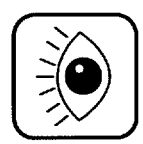

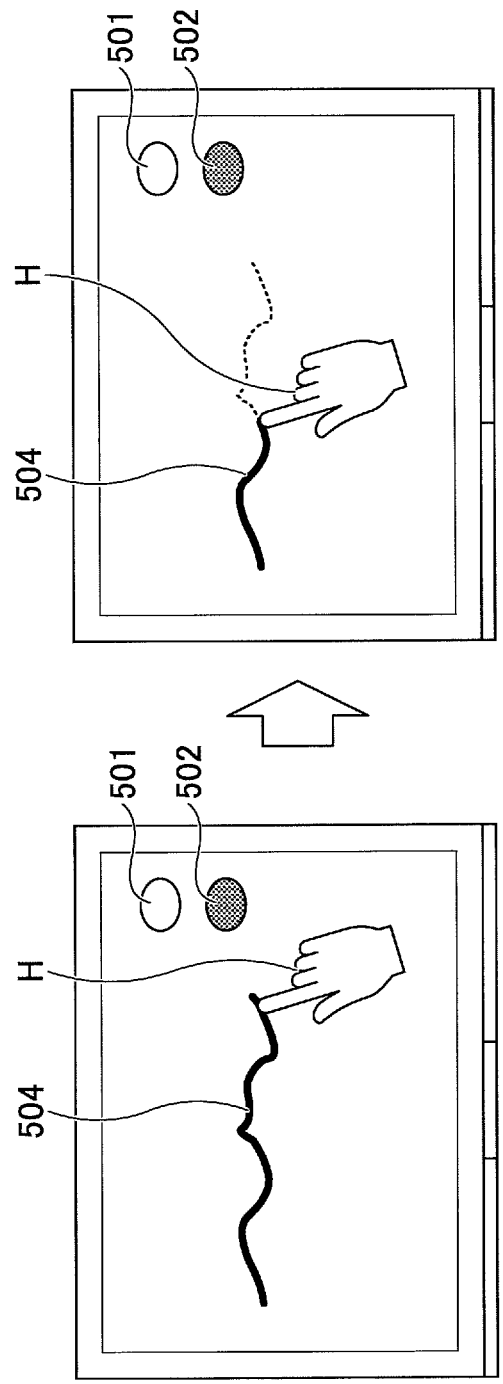

FIG.22

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.24

| X COORDINATE VALUE | Y COORDINATE VALUE | TIME DIFFERENCE | PEN PRESSURE |
|---|---|---|---|
| 10 | 10 | 100 | 255 |
| 12 | 10 | 200 | 255 |
| 14 | 12 | 300 | 255 |
| ... | ... | ... | ... | c001 c002 c003

FIG.25

| MEDIA DATA ID | DATA TYPE | RECORDING TIME | X COORDINATE VALUE | Y COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.26

| PRODUCT ID | LICENSE ID | EXPIRATION DATE |
|---|---|---|
| 1001 | 12345678abcdefgh | 2012/12/31 |
| 1001 | 4321dcba8765hgfe | – |
| ⋮ | ⋮ | ⋮ |

FIG.27

| NAME | MAIL ADDRESS |
|---|---|
| TARO | taro@alpha.co.jp |
| HANAKO | hanako@beta.co.jp |
| – | jiro@gamma.co.jp |
| ⋮ | ⋮ |

FIG.28

| |
|---|
| iwb_20130610104423.pdf |
| iwb_20130625152245.pdf |
| iwb_20130628113418.pdf |
| ⋮ |

FIG.29

| NAME | IP ADDRESS |
|---|---|
| CONFERENCE ROOM 1 | 192.0.0.1 |
| CONFERENCE ROOM 2 | 192.0.0.2 |
| – | 192.0.0.3 |
| ⋮ | ⋮ |

FIG.30

| NAME | IP ADDRESS |
|---|---|
| CONFERENCE ROOM 1 | 192.0.0.1 |
| CONFERENCE ROOM 2 | 192.0.0.2 |
| – | 192.0.0.8 |
| ⋮ | ⋮ |

FIG.31

| SEQ | OPERATION NAME | TRANSMISSION SOURCE IP ADDRESS: Port No. | TRANSMISSION DESTINATION IP ADDRESS: Port No. | OPERATION TYPE | OPERATION TARGET (PAGE DATA ID /STROKE DATA ID) | DATA |
|---|---|---|---|---|---|---|
| 1 | ADD | 192.0.0.1: 50001 | 192.0.0.1: 50000 | STROKE | p005 | (STROKE DATA) |
| 2 | ADD | 192.0.0.1: 50001 | 192.0.0.2: 50000 | STROKE | p005 | (STROKE DATA) |
| 3 | UPDATE | 192.0.0.2: 50001 | 192.0.0.1: 50000 | STROKE | s006 | (50,40) |
| 4 | UPDATE | 192.0.0.1: 50000 | 192.0.0.1: 50001 | STROKE | s006 | (50,40) |
| 5 | DELETE | 192.0.0.1: 50001 | 192.0.0.1: 50000 | STROKE | s007 | — |
| 6 | DELETE | 192.0.0.2: 50001 | 192.0.0.1: 50000 | STROKE | s007 | — |
| 7 | ADD | 192.0.0.1: 50001 | 192.0.0.1: 50000 | PAGE | — | — |
| 8 | ADD | 192.0.0.1: 50001 | 192.0.0.2: 50000 | PAGE | — | — |
| 9 | ADD | 192.0.0.2: 50001 | 192.0.0.1: 50000 | IMAGE | p006 | aaa.jpg |
| 10 | ADD | 192.0.0.1: 50000 | 192.0.0.1: 50001 | IMAGE | p006 | aaa.jpg |
| ... | ... | ... | ... | ... | ... | ... |

ELECTRONIC BLACKBOARD, STORAGE MEDIUM, AND INFORMATION DISPLAY METHOD

CROSS-REFERENCE TO RELATED APPLICATION

The present application is a continuation application of International Application No. PCT/JP2016/078915 filed on Sep. 29, 2016, which claims priority to Japanese Patent Application No. 2015-194991 filed on Sep. 30, 2015. The contents of these applications are incorporated herein by reference in their entirety.

BACKGROUND OF THE INVENTION

1. Field of the Invention

The present invention relates to an electronic blackboard, a storage medium, and an information display method.

2. Description of the Related Art

An electronic blackboard with a touch panel mounted on a large flat panel display is known. The electronic blackboard displays a screen that plays a role of a blackboard, captures the trajectory of an electronic pen or a finger, etc., via the touch panel, and draws the trajectory as handwritten contents on the screen. Therefore, the user can use the screen like a blackboard. Also, with an electronic blackboard that can be connected to a personal computer, the same screen as the personal computer can be displayed and handwritten contents can be superimposed and drawn on the screen of the electronic blackboard, or the personal computer can be operated according to information input to the electronic blackboard from a touch panel.

The electronic blackboard has a mode of drawing handwritten contents (hereinafter referred to as a "handwriting mode"), and also a mode for enlarging or reducing the drawing contents (hereinafter referred to as a "gesture mode"). The user can appropriately switch between these two modes, for example, by operating menu buttons. However, if the user needs to perform an explicit operation for switching the modes, there is a risk that the operability is degraded.

Therefore, a technology for switching modes without the need of explicit operations by the user, has been devised (see, for example, Patent Literature 1). Patent Literature 1 discloses a display device that accepts a gesture operation, when a handwritten trajectory matches a predetermined pattern.

Patent Literature 1: Japanese Unexamined Patent Application Publication No. 2013-012134

SUMMARY OF THE INVENTION

An aspect of the present invention provides an electronic blackboard, a storage medium, and an information display method in which one or more of the disadvantages of the related art are reduced.

According to one aspect of the present invention, there is provided an electronic blackboard including a display configured to display visible information, the electronic blackboard including a coordinate detector configured to detect coordinates of an object in the display; a number detector configured to detect a number of the objects in the display, based on the coordinates of the object detected by the coordinate detector; a time measurer configured to start measuring a predetermined time in response to detecting a first one of the objects by the number detector; and a mode determiner configured to determine that the electronic blackboard is in a handwriting mode in which the visible information is displayed based on the coordinates, in response to determining that a second one of the objects is not detected by the number detector upon completing to measure the predetermined time by the time measurer, and to determine that the electronic blackboard is in a gesture mode in which an operation with respect to the visible information is accepted, in response to determining that the second one of the objects is detected by the number detector before completing to measure the predetermined time by the time measurer, wherein the mode determiner uses the coordinates for handwriting upon determining that the electronic blackboard is in the handwriting mode, and the mode determiner uses the coordinates for accepting the operation of the gesture mode upon determining that the electronic blackboard is in the gesture mode.

BRIEF DESCRIPTION OF THE DRAWINGS

FIG. 6 is an example of a configuration diagram of image layers according to an embodiment of the present invention;

FIG. 17C is an example of a diagram schematically illustrating menus displayed on the display, in which an operation performed when the user presses the eraser button is displayed according to the third embodiment of the present invention;

FIG. 22 is a table depicting an example of page data.

FIG. 24 is a table depicting an example of coordinate array data.

FIG. 25 is a table depicting an example of media data included in the page data.

FIG. 26 is a table depicting an example of a remote license management table.

FIG. 27 is a table depicting an example of an address book management table.

FIG. 28 is a table depicting an example of stored backup data.

FIG. 29 is a table depicting an example of a connection destination management table.

FIG. 30 is a table depicting an example of a participation site management table.

FIG. 31 is a table depicting an example of operation data.

DETAILED DESCRIPTION OF THE PREFERRED EMBODIMENTS

In the electronic blackboard of the related art, there is a problem that there is a risk of erroneously determining the operation mode of the electronic blackboard. First, in the gesture mode, there is an operation that the user uses two fingers, and the electronic blackboard determines that the mode is a gesture mode when two objects (for example, two fingers) are detected on the screen. However, when there is a time lag between the timings of touching the touch panel with two fingers, it may be erroneously determined that the mode is the handwriting mode when the first finger is detected, and the handwritten contents may be drawn. Conversely, when the user is drawing handwritten contents with one finger in the handwriting mode, and the other finger, etc., touches the touch panel, it may be determined that the electronic blackboard is in the gesture mode, and a gesture operation may be accepted.

A problem to be solved by an embodiment of the present invention is to provide an electronic blackboard capable of appropriately determining the operation mode.

Hereinafter, embodiments for carrying out the present invention will be described with reference to drawings.

The electronic blackboard according to the present embodiment waits for a predetermined time period without performing processing, after detecting a finger touching the display of the electronic blackboard, and determines whether the mode is the gesture mode or the handwriting mode according to whether the second finger is detected within a predetermined time period.

When a second set of coordinates is detected within a predetermined time period, it is determined that the mode is the gesture mode.

When a second set of coordinates is not detected within a predetermined time period, it is determined that the mode is the handwriting mode.

When the user operates the electronic blackboard in the gesture mode, it is considered that the second finger will touch the display of the electronic blackboard within a predetermined time period from when the first finger touches the display. Therefore, by waiting for a predetermined time period without performing processing, it is possible to avoid a situation where handwriting contents are drawn, when the user is intending to perform a gesture operation. Furthermore, even if the second finger touches the display while the user is handwriting with the first finger, it is not determined that the mode is the gesture mode after the lapse of a predetermined time period, and therefore it is possible to avoid a situation of erroneously determining that the mode the gesture mode during the handwriting mode.

<Overview of System>

Figure 1:
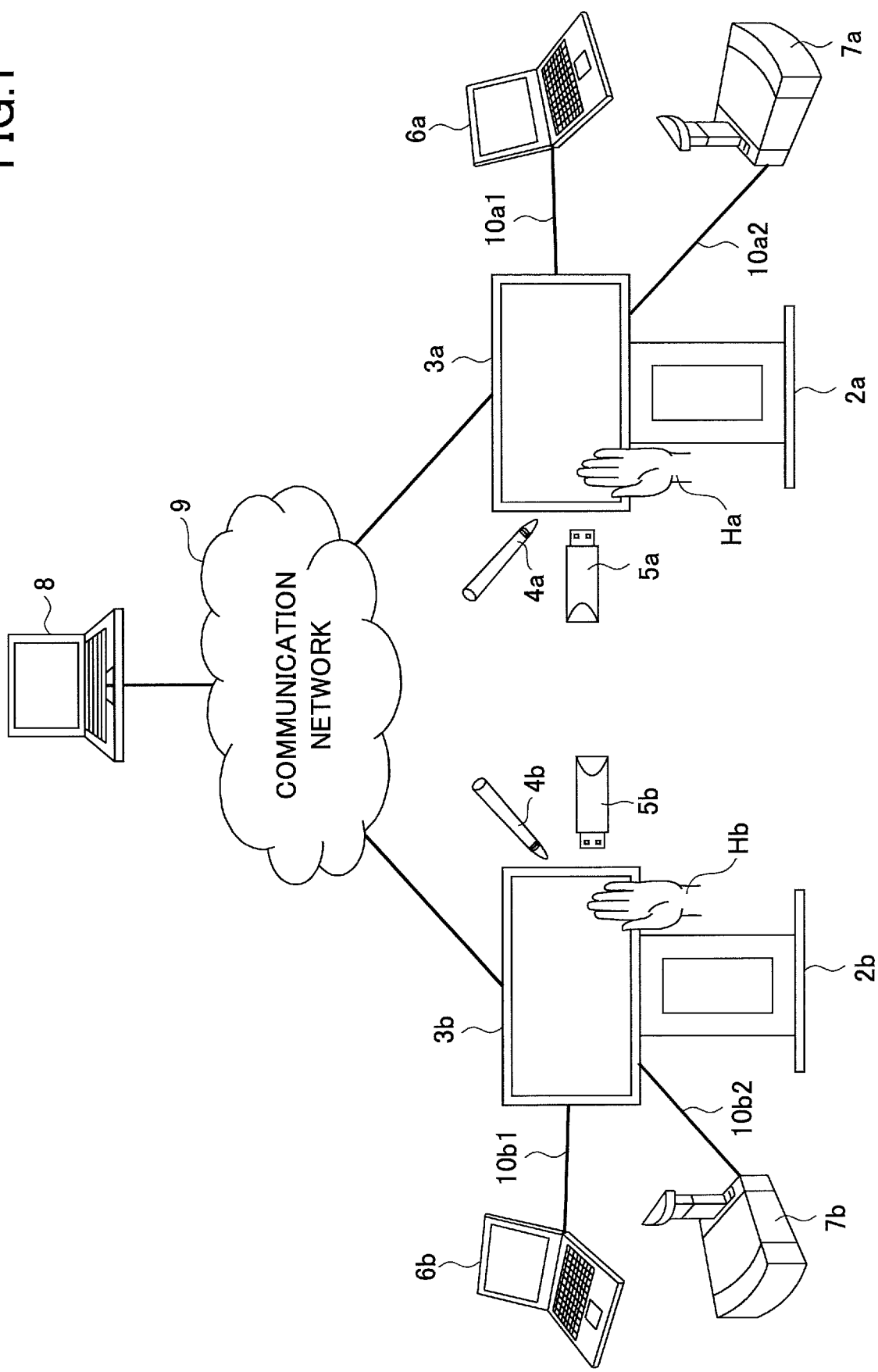
FIG. 1 is an overall configuration diagram of an image processing system according to an embodiment of the present invention.

FIG. 1 is an overall configuration diagram of an image processing system according to the present embodiment. In FIG. 1, for the sake of simplifying the descriptions, only two electronic blackboards 2a and 2b and two electronic pens 4a and 4b, etc., respectively associated with the electronic blackboards are illustrated; however, three or more electronic blackboards and electronic pens, etc., may be used. As illustrated in FIG. 1, an image processing system 1 includes a plurality of the electronic blackboards 2a and 2b, a plurality of the electronic pens 4a and 4b, Universal Serial Bus (USB) memories 5a and 5b, notebook personal computers (PCs) 6a and 6b, TV (video) conference terminals 7a and 7b, and a PC 8. Furthermore, the electronic blackboards 2a and 2b and the PC 8 are communicably connected via a communication network 9. Furthermore, the plurality of electronic blackboards 2a and 2b are provided with displays 3a and 3b, respectively.

Furthermore, the electronic blackboard 2a may display, on the display 3a, an image drawn according to an event generated by the electronic pen 4a (the pen tip of the electronic pen 4a or the pen bottom of the electronic pen 4a touching the display 3a). Note that the electronic blackboard 2a may change an image displayed on the display 3a, not only based on an event generated by the electronic pen 4a, but also based on an event generated by a hand Ha of the user, etc. (a gesture such as enlargement, reduction, and page turning, etc.).

Furthermore, the USB memory 5a can be connected to the electronic blackboard 2a. The electronic blackboard 2a can read electronic files such as a Portable Document Format (PDF) file from the USB memory 5a, and the electronic blackboard 2a can record electronic files in the USB memory 5a. Furthermore, to the electronic blackboard 2a, the notebook PC 6a is connected via a cable 10a1 capable of communication according to standards such as Display-Port, Digital Visual Interface (DVI), High-Definition Multimedia Interface (HDMI) (registered trademark), and Video Graphics Array (VGA). The electronic blackboard 2a generates an event according to the display 3a being touched, and transmits event information indicating the generated event, to the notebook PC 6a, similar to an event from an input device such as a mouse or a keyboard, etc. Similarly, to the electronic blackboard 2a, the TV (video) conference terminal 7a is connected via a cable 10a2 capable of communicating according to the above standards. Note that the notebook PC 6a and the TV (video) conference terminal 7a may communicate with the electronic blackboard 2a by wireless communication compliant with various wireless communication protocols such as Bluetooth (registered trademark).

On the other side, at another site where the electronic blackboard 2b is installed, similar to the above, the electronic blackboard 2b having the display 3b, the electronic pen 4b, the USB memory 5b, the notebook PC 6b, the TV (video) conference terminal 7b, a cable 10b1, and a cable 10b2 are used. Furthermore, it is also possible to change the image displayed on the display 3b based on the event generated by the user's hand Hb, etc.

Accordingly, an image drawn on the display 3a of the electronic blackboard 2a at one site is also displayed on the display 3b of the electronic blackboard 2b at another site. Conversely, an image drawn on the other display 3b of the electronic blackboard 2b at the other site is also displayed on the display 3a of the electronic blackboard 2a at one site. As described above, the image processing system 1 can perform a remote sharing process of sharing the same image at remote locations, and therefore the image processing system 1 is highly convenient when used for a conference held at remote locations, etc.

Note that in the following description, when any electronic blackboard is indicated among a plurality of electronic blackboards, the electronic blackboard is referred to as "the electronic blackboard 2". When any display is indicated among a plurality of displays, the display is referred to as "the display 3". When any electronic pen is indicated among a plurality of electronic pens, the electronic pen is referred to as "the electronic pen 4". When any USB memory is indicated among a plurality of USB memories, the USB memory is referred to as "the USB memory 5". When any notebook PC is indicated among a plurality of notebook PCs, the notebook PC is referred to as "the notebook PC 6". When any TV (video) conference terminal is indicated among a plurality of TV (video) conference terminals, the TV (video) conference terminal is referred to as "the TV (video) conference terminal 7". Furthermore, when any hand is indicated among the hands of a plurality of users, the hand is referred to as "the hand H". When any cable is indicated among a plurality of cables, the cable is referred to as "the cable 10".

Furthermore, in the present embodiment, an electronic blackboard will be described as an example of an image processing apparatus; however, the image processing apparatus is not limited as such. Other examples of the image processing apparatus are an electronic signboard (digital signage), a telestrator used in sports and weather forecasts, etc., or a remote image (video) diagnostic device, etc. Furthermore, although the notebook PC 6 will be described as an example of the information processing terminal; the information processing terminal is not limited as such. Other examples of the information processing terminal are terminals capable of supplying image frames such as a desktop PC, a tablet PC, a Personal Digital Assistant (PDA), a digital video camera, a digital camera, and a game console. Furthermore, the communication network includes the Internet, a Local Area Network (LAN), and a mobile phone communication network, etc. Furthermore, in the present embodiment, although a USB memory is described as an example of a recording medium; the recording medium is not limited as such. Other examples of the recording medium are various kinds of recording media such as a secure digital (SD) card.

<Hardware Configuration of Electronic Blackboard>

Next, with reference to FIG. 2, the hardware configuration of the electronic blackboard of the present embodiment will be described. Note that FIG. 2 is a hardware configuration diagram of the electronic blackboard.

Figure 2:
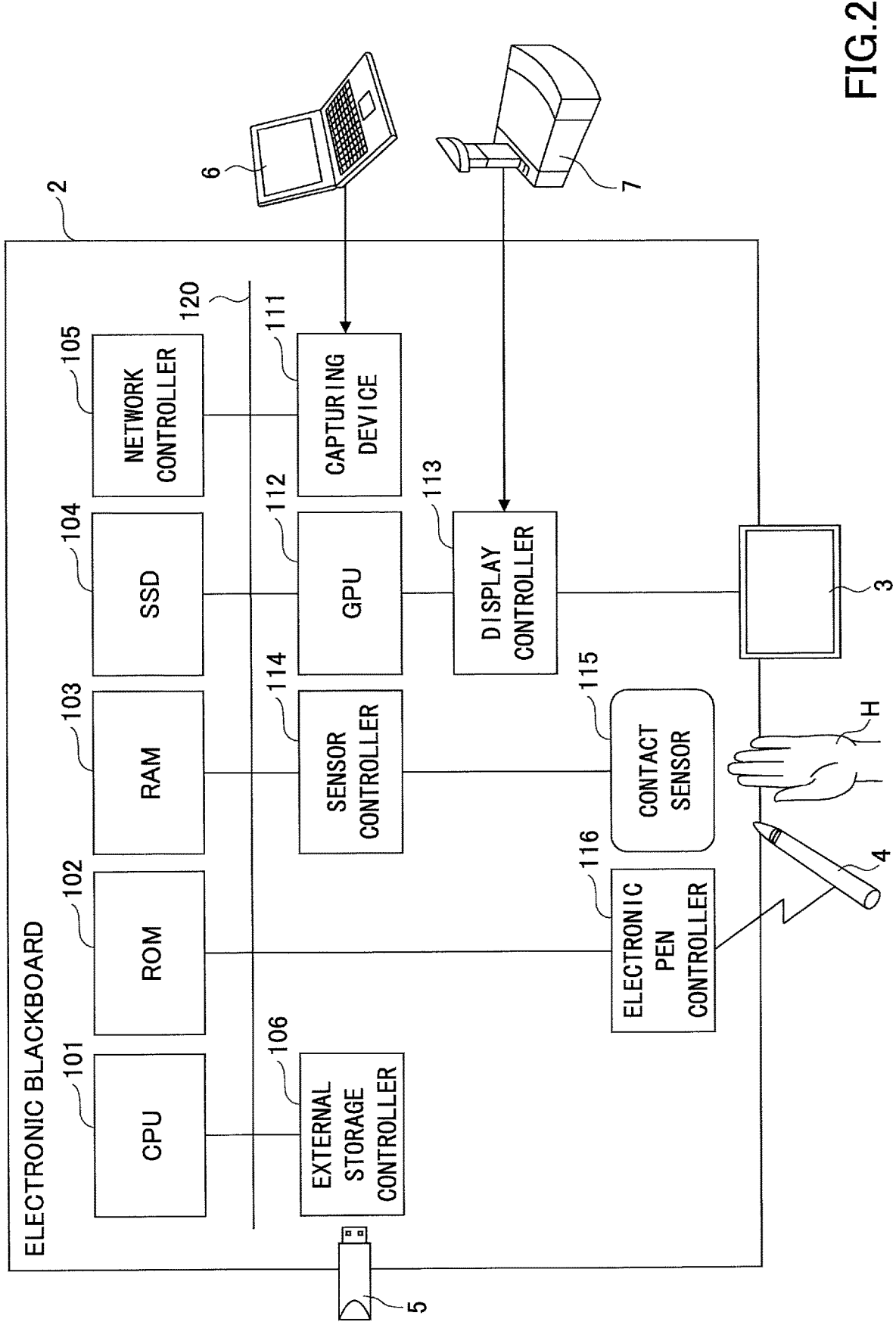
FIG. 2 is an example of a hardware configuration diagram of an electronic blackboard according to an embodiment of the present invention.

As illustrated in FIG. 2, the electronic blackboard 2 includes a Central Processing Unit (CPU) 101 for controlling the operations of the entire electronic blackboard 2, a Read-Only Memory (ROM) 102 storing programs used for driving the CPU 101 such as an Initial Program Loader (IPL), a Random Access Memory (RAM) 103 used as a work area of the CPU 101, a Solid State Drive (SSD) 104 for storing various kinds of data such as a program for the electronic blackboard 2, a network controller 105 for controlling communication with the communication network 9, and an external storage controller 106 for controlling communication with the USB memory 5.

Furthermore, the electronic blackboard 2 includes a capturing device 111 for displaying video information as a still image or a moving image on the display of the notebook PC 6, a Graphics Processing Unit (GPU) 112 that is specifically used for graphics, and a display controller 113 for implementing control and managing the screen display for outputting output images from the GPU to the display 3 and the TV (video) conference terminal 7.

The electronic blackboard 2 further includes a sensor controller 114 for controlling the process of a contact sensor 115, and the contact sensor 115 for detecting that the electronic pen 4 or the user's hand H has touched the display 3. The contact sensor 115 performs input of coordinates and detection of coordinates by an infrared ray blocking method. In the method of inputting the coordinates and detecting the coordinates, two light receiving/emitting devices, which are installed at both upper end portions of the display 3, emit a plurality of infrared rays parallel with the display 3, the infrared rays are reflected by reflecting members arranged around the display 3, and receiving elements receive the infrared rays that have returned along the same optical paths as the optical paths of the light that has been emitted. The contact sensor 115 outputs, to the sensor controller 114, the identification (ID) of the infrared rays, which are emitted by the two light emitting/receiving devices and blocked by an object, and the sensor controller 114 identifies the coordinate position that is the contact position of the object. Note that all of the following IDs are examples of identification information. An example of the object is a finger and the electronic pen 4; however, the object may be any object that blocks light. Furthermore, the object is not limited to an opaque object; the object may be made of a transparent or a translucent material such as glass and plastic. Furthermore, the contact sensor 115 is not limited to the infrared ray blocking method, but may be various kinds of detection means such as a capacitive type touch panel that identifies the contact position by detecting a change in electrostatic capacity, a resistive film type touch panel that identifies the contact position by a change in the voltage of two opposing resistive films, and an electromagnetic induction type touch panel for detecting the electromagnetic induction caused by the contact of the contact object with the display unit to identify the contact position.

Furthermore, the electronic blackboard 2 is provided with an electronic pen controller 116. The electronic pen controller 116 communicates with the electronic pen 4 to determine whether the pen tip or the pen bottom of the electronic pen 4 has touched the display 3. Note that the electronic pen controller 116 may not only determine whether the pen tip or the pen bottom of the electronic pen 4 has touched the display 3, but may also determine whether the part of the electronic pen 4 held by the user or other parts of the electronic pen have touched the display 3.

Furthermore, the electronic blackboard 2 includes a bus line 120 such as an address bus and a data bus, etc., for electrically connecting the CPU 101, the ROM 102, the RAM 103, the SSD 104, the network controller 105, the external storage controller 106, the capturing device 111, the GPU 112, the sensor controller 114, and the electronic pen controller 116, as illustrated in FIG. 2.

Note that a program for the electronic blackboard 2 may be distributed upon being recorded in a computer-readable recording medium such as a Compact Disk Read-Only Memory (CD-ROM).

<Functional Configuration of Electronic Blackboard>

Figure 3:
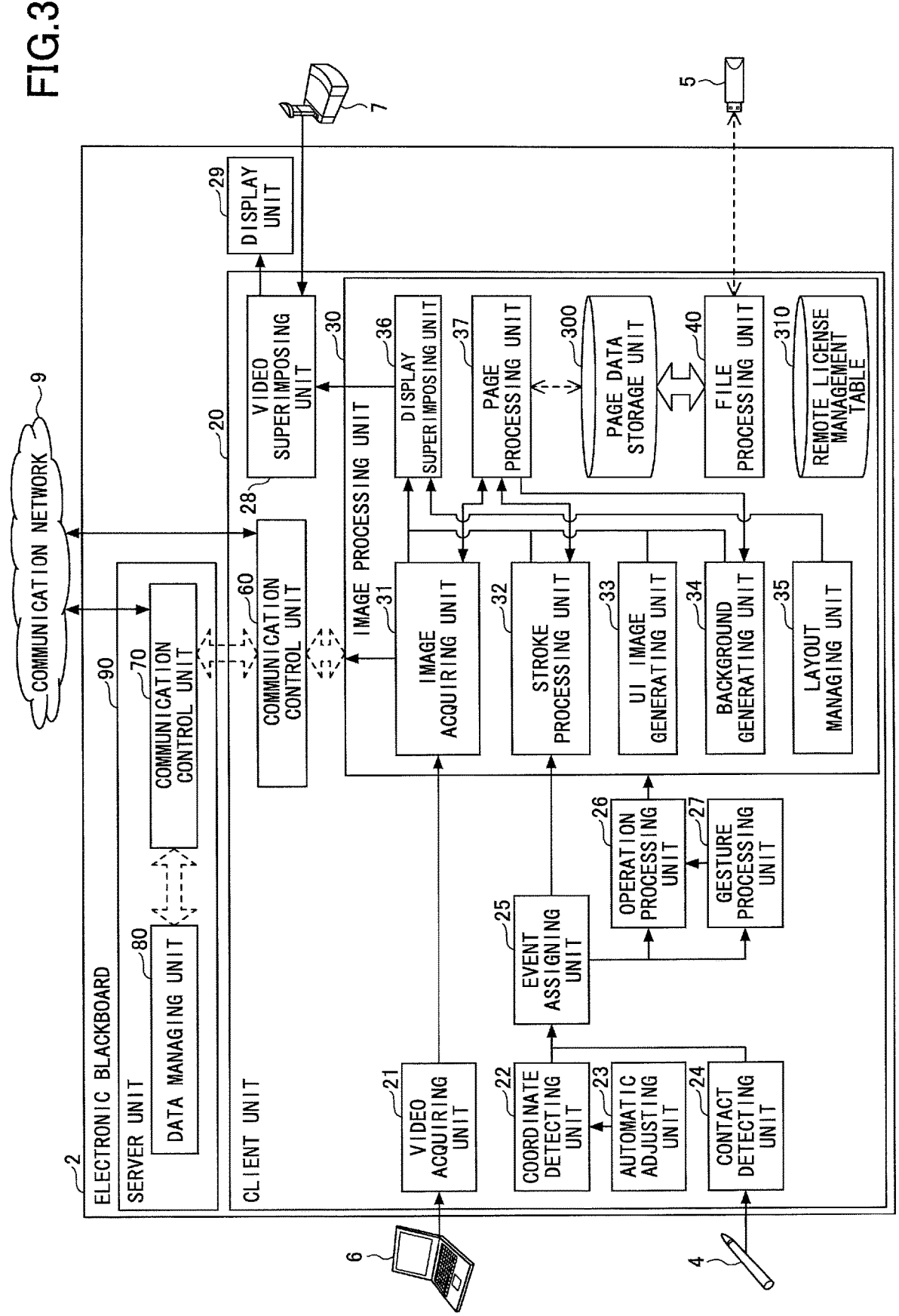
FIG. 3 is an example of a functional block diagram of the electronic blackboard according to an embodiment of the present invention.

Next, the functional configuration of the electronic blackboard will be described with reference to FIGS. 3 through 6. Note that first, the overall functional configuration of the electronic blackboard 2 will be described with reference to FIG. 3. FIG. 3 is a functional block diagram of the electronic blackboard.

The electronic blackboard 2 has the functional configuration illustrated in FIG. 3, according to the hardware configuration illustrated in FIG. 2 and programs. The electronic blackboard 2 can be a "hosting device" for initially starting a remote sharing process, and the electronic blackboard 2 can also be a "participating device" to participate later in the remote sharing process already started. Furthermore, the electronic blackboard 2 is broadly formed of both a client unit 20 and a server unit 90. The client unit 20 and the server unit 90 are functions implemented in one casing of the electronic blackboard 2. Furthermore, when the electronic blackboard 2 becomes a hosting device, the client unit 20 and the server unit 90 are implemented in this electronic blackboard 2. When the electronic blackboard 2 becomes a participating device, the client unit 20 is implemented in the electronic blackboard 2; however, the server unit 90 is not implemented. That is, in FIG. 1, when the electronic blackboard 2a is the hosting device and the electronic blackboard 2b is the participating device, the client unit 20 of the electronic blackboard 2a communicates, via the server unit 90 implemented in the same electronic blackboard 2a, with the client unit 20 of the other electronic blackboard 2b. On the other side, the client unit 20 of the electronic blackboard 2b communicates with the client unit 20 of the other electronic blackboard 2a, via the server unit 90 implemented in the other electronic blackboard 2a.

[Functional Configuration of Client Unit 20]

Next, the functional configuration of the client unit 20 will be described mainly with reference to FIGS. 3 through 5. The client unit 20 includes a video acquiring unit 21, a coordinate detecting unit 22, an automatic adjusting unit 23, a contact detecting unit 24, an event assigning unit 25, an operation processing unit 26, a gesture processing unit 27, a video superimposing unit 28, an image processing unit 30, and a communication control unit 60.

Among these elements, the video acquiring unit 21 acquires an output image of a video output device connected to the cable 10. Upon receiving image signals from a video output device, the video acquiring unit 21 analyzes the image signals to derive the resolution of the image frame that is the display image of the video output device formed by the image signals, and to derive image information such as the frequency of updating the image frame, and outputs this information to an image acquiring unit 31.

The coordinate detecting unit 22 detects the coordinate position of an event caused by the user on the display 3 (such as an action of the user's hand H touching the display 3). The coordinate detecting unit 22 also detects the area of the touched portion.

The automatic adjusting unit 23 is activated when the electronic blackboard 2 is activated, and adjusts the parameters used when processing images of a sensor camera by the coordinate detecting unit 22 that detects coordinates by an optical sensor method, so that the coordinate detecting unit 22 can output an appropriate value.

The contact detecting unit 24 detects an event caused by the user (an action in which the pen tip of the electronic pen 4 or the pen bottom of the electronic pen 4 is pressed on (touches) the display 3).

The event assigning unit 25 assigns the coordinate position of an event detected by the coordinate detecting unit 22 and the detection result detected by the contact detecting unit 24, to each of the events including stroke drawing, a UI operation, and a gesture operation. Here, the "stroke drawing" is an event in which the user presses down the electronic pen 4 on the display 3 when a stroke image (B) to be described later and illustrated in FIG. 6 is displayed on the display 3, moves the electronic pen 4 in the pressed state, and finally releases the electronic pen 4 from the display 3. By this stroke drawing, for example, alphabetical letters "S" and "T", etc., are drawn on the display 3. Note that this "stroke drawing" does not only include drawing an image, but also includes the events of erasing an image already drawn or editing a drawn image.

The "UI operation" is an event in which the user presses a predetermined position with the electronic pen 4 or the hand H when a UI image (A) to be described later and illustrated in FIG. 6 is displayed on the display 3. By this UI operation, for example, the color and width of the lines drawn by the electronic pen 4 are set.

The "gesture operation" is an event in which the user touches the display 3 with the hand H or moves the hand H on the display 3, when a stroke image (B) to be described later and illustrated in FIG. 6 is displayed on the display 3. By this gesture operation, for example, it is possible to enlarge (or reduce) an image, change the display area, or switch pages, etc., by moving the hand H while the user is touching the display 3 with the hand H.

The operation processing unit 26 executes various operations according to elements of the UI for which an event has occurred, among events determined as UI operations by the event assigning unit 25. Examples of elements of the UI include buttons, lists, check boxes, and text boxes. The gesture processing unit 27 executes an operation corresponding to an event determined to be a gesture operation by the event assigning unit 25.

The video superimposing unit 28 displays an image superimposed by a later-described display superimposing unit 36, as a video, on a display unit 29. The display unit 29 has a display function implemented by the display 3. Furthermore, the video superimposing unit 28 performs a picture-in-picture operation to superimpose, on a video from a video output device (the notebook PC 6, etc.), a video sent from another video output device (such as the TV (video) conference terminal 7). Furthermore, the video superimposing unit 28 performs a switching operation such that a video obtained by the picture-in-picture operation and displayed on a part of the display unit 29, is displayed on the entire display unit 29.

The image processing unit 30 performs a process of superimposing the respective image layers, etc., as illustrated in FIG. 6. The image processing unit 30 includes the image acquiring unit 31, a stroke processing unit 32, a UI image generating unit 33, a background generating unit 34, a layout managing unit 35, the display superimposing unit 36, a page processing unit 37, a file processing unit 40, a page data storage unit 300, and a remote license management table 310.

Among these elements, the image acquiring unit 31 acquires each frame as an image from the video acquired by the video acquiring unit 21. The image acquiring unit 31 outputs the data of the image to the page processing unit 37. This image corresponds to an output image (C) from the video output device (the notebook PC 6, etc.) illustrated in FIG. 6.

The stroke processing unit 32 draws an image, erases the drawn image, and edits the drawn image, based on an event relating to the stroke drawing assigned by the event assigning unit 25. The image created by stroke drawing corresponds to the stroke image (B) illustrated in FIG. 6. Furthermore, the results of drawing, erasing, and editing of images based on the stroke drawing, are stored, as operation data to be described later, in an operation data storage unit 840.

The UI image generating unit 33 generates a User Interface (UI) image set in advance in the electronic blackboard 2. This UI image corresponds to the UI image (A) illustrated in FIG. 6.

The background generating unit 34 receives, from the page processing unit 37, the media data of the page data read from the page data storage unit 300 by the page processing unit 37. The background generating unit 34 outputs the received media data to the display superimposing unit 36. Furthermore, the image based on this media data corresponds to a background image (D) illustrated in FIG. 6. The pattern of the background image (D) is plain or a grid display, etc.

The layout managing unit 35 manages, with respect to the display superimposing unit 36, the layout information indicating the layout of each image output from the image acquiring unit 31, the stroke processing unit 32, and the UI image generating unit 33 (or the background generating unit 34). Accordingly, the layout managing unit 35 is able to send an instruction to the display superimposing unit 36, as to the positions of displaying the output image (C) and the stroke image (B), in the UI image (A) and the background image (D), or to not display the output image (C) or the stroke image (B).

Based on the layout information output from the layout managing unit 35, the display superimposing unit 36 lays out each image output from the image acquiring unit 31, the stroke processing unit 32, and the UI image generating unit 33 (the background generating unit 34).

The page processing unit 37 integrates the data of the stroke image (B) and the data of the output image (C) into a single piece of page data, and stores the page data in the page data storage unit 300. The data of the stroke image (B) forms part of the page data, as stroke arrangement data (pieces of stroke data) indicated by a stroke arrangement data ID illustrated in FIG. 6. The data of the output image (C) forms part of the page data, as media data indicated by a media data ID illustrated in FIG. 6. Then, when this media data is read from the page data storage unit 300, the media data is handled as data of the background image (D).

Furthermore, the page processing unit 37 transmits the media data of the temporarily stored page data, to the display superimposing unit 36 via the background generating unit 34. Accordingly, the video superimposing unit 28 can redisplay the background image (D) on the display 3. Furthermore, the page processing unit 37 can return the stroke arrangement data (pieces of stroke data) of the page data, to the stroke processing unit 32, so that the stroke can be reedited. Furthermore, the page processing unit 37 can erase or duplicate the page data.

That is, the data of the output image (C) displayed on the display 3 at the time point when the page processing unit 37 stores the page data in the page data storage unit 300, is temporarily stored in the page data storage unit 300, and subsequently, when being read from the page data storage unit 300, the data is read as media data indicating the background image (D). Then, the page processing unit 37 outputs the stroke arrangement data indicating the stroke image (B), among the page data read from the page data storage unit 300, to the stroke processing unit 32. Furthermore, the page processing unit 37 outputs the media data indicating the background image (D), among the page data read from the page data storage unit 300, to the background generating unit 34.

The display superimposing unit 36 superimposes the output image (C) from the image acquiring unit 31, the stroke image (B) from the stroke processing unit 32, the UI image (A) from the UI image generating unit 33, and the background image (D) from the background generating unit 34, in accordance with a layout specified by the layout managing unit 35. Accordingly, as illustrated in FIG. 6, the respective layers of the UI image (A), the stroke image (B), the output image (C), and the background image (D) are superimposed in an order in which the user can see the images even if the images overlap each other.

Furthermore, the display superimposing unit 36 can switch between the image (C) and the image (D) illustrated in FIG. 6 to be exclusively overlapping the image (A) and the image (B). For example, in the case where the cable 10 between the electronic blackboard 2 and the video output device (the notebook PC 6, etc.) is pulled out while the image (A), the image (B), and the image (C) are initially displayed, the image (C) can be excluded from the superimposition targets, and the image (D) may be displayed, according to specifications by the layout managing unit 35. In this case, the display superimposing unit 36 also performs processes of enlarging the display, reducing the display, and moving the display area.

The page data storage unit 300 stores page data as indicated in FIG. 22.

FIG. 22 conceptually indicates the page data. The page data is data for one page (stroke arrangement data (pieces of stroke data) and media data) displayed on the display 3. Note that there are many types of parameters included in the page data, and therefore, here, the contents of the page data will be described separately in FIGS. 22 to 25.

As indicated in FIG. 22, the page data includes a page data ID for identifying any one of the pages; a start time indicating the time when the display of the page has started; an end time indicating the time when rewriting of the content of the page by strokes and gestures, etc., is no longer performed; a stroke arrangement data ID for identifying the stroke arrangement data generated by strokes drawn by the electronic pen 4 or the user's hand H; and a media data ID for identifying the media data, that are stored in association with each other. The stroke arrangement data is data for displaying the stroke image (B) illustrated in FIG. 6 on the display 3. The media data is data for displaying the background image (D) illustrated in FIG. 6 on the display 3.

According to such page data, for example, when the user draws the alphabetical letter "S" with the electronic pen 4, the letter is written by one stroke, and therefore one letter alphabetical letter [S] is indicated by one stroke data ID. However, when the user draws the alphabetical letter "T" with the electronic pen 4, the letter is written by two strokes, and therefore one alphabetical letter "T" is indicated by two stroke data IDs.

Figure 23:
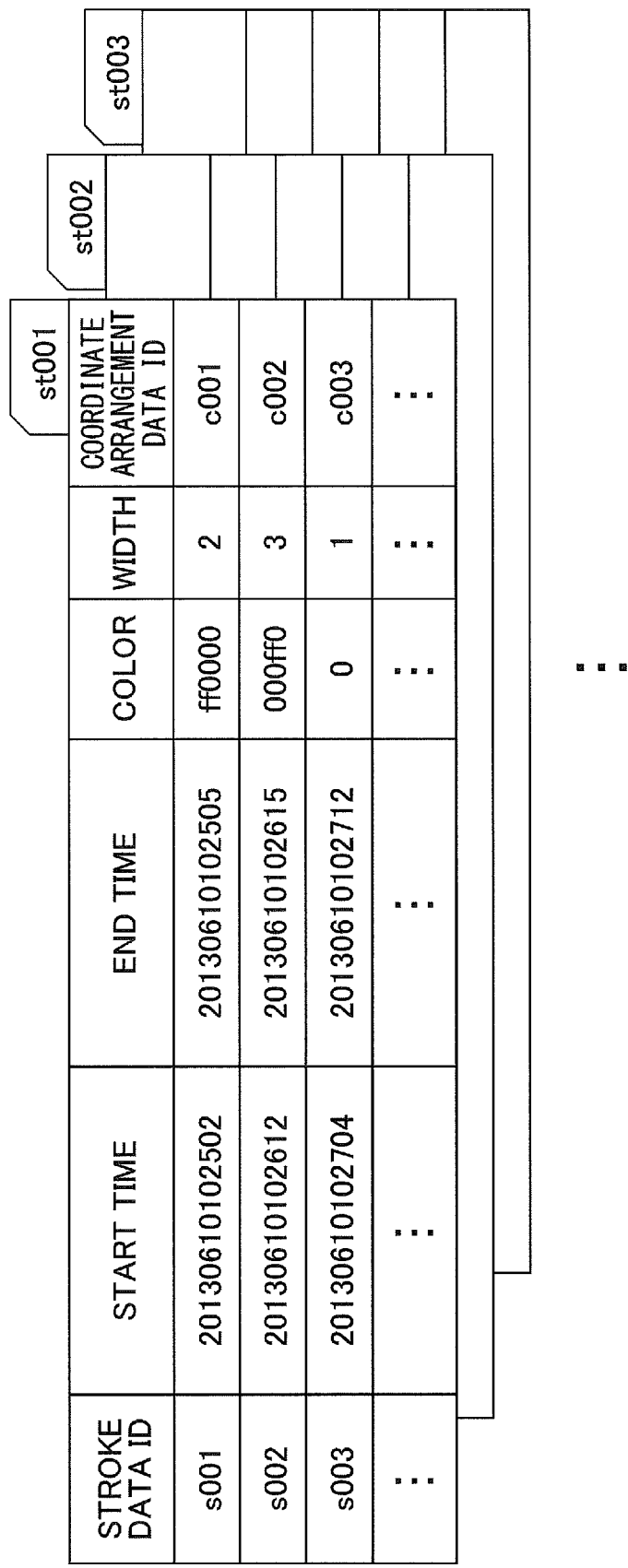
FIG. 23 is a table depicting an example of stroke arrangement data.

Furthermore, the stroke arrangement data indicates detailed information as indicated in FIG. 23. FIG. 23 conceptually indicates stroke arrangement data. As indicated in FIG. 23, one piece of stroke arrangement data is expressed by a plurality of pieces of stroke data. Also, one piece of stroke data includes a stroke data ID for identifying the stroke data, a start time indicating the time of starting to write one stroke, an end time indicating the time of finishing writing one stroke, the color of the stroke, the width of the stroke, and a coordinate arrangement data ID for identifying the arrangement of the passing points of the stroke.

Furthermore, the coordinate array data indicates detailed information as indicated in FIG. 24. FIG. 24 conceptually indicates the coordinate arrangement data. As indicated in FIG. 24, the coordinate arrangement data indicates information including one point (the X coordinate value and the Y coordinate value) on the display 3, the time (milliseconds (ms)) of the difference from the start time of the stroke to the time of passing the one point, and the pen pressure of the electronic pen 4 at this one point. That is, an assembly of points indicated in FIG. 24, is indicated by one piece of coordinate arrangement data indicated in FIG. 23. For example, when the user draws the alphabetical letter "S" with the electronic pen 4, the letter is written by a single stroke, but the stroke passes through a plurality of passing points before finishing drawing the letter "S", and therefore the coordinate array data indicates information of the plurality of passing points.

Furthermore, the media data in the page data indicated in FIG. 22 indicates detailed information as indicated in FIG. 25.

FIG. 25 conceptually indicates the media data. As indicated in FIG. 25, in the media data, the media data ID in the page data indicated in Table 1 FIG. 22, the data type of the media data, the recording time when the page data has been stored in the page data storage unit 300 from the page processing unit 37, the position of the image (the X coordinate value and the Y coordinate value) and the size of the image (width and height) displayed on the display 3 according to the page data, and data indicating the content of the media data, are associated with each other. Among this information, the position of the image displayed on the display 3 according to the page data, indicates the position at the upper left end of the image displayed according to the page data, assuming that the coordinates of the upper left end of the display 3 are (X coordinate value, Y coordinate value)=(0, 0).

Furthermore, referring back to FIG. 3, the description will be continued. The remote license management table 310 manages license data necessary for executing the remote sharing process. In the remote license management table 310, as indicated in FIG. 26, the product ID of the electronic blackboard 2, the license ID used for authentication, and the expiration date of the license, are managed in association with each other.

(Functional Configuration of File Processing Unit 40)

Next, with reference to FIG. 4, the functional configuration of the file processing unit 40 illustrated in FIG. 3 will be described. Note that FIG. 4 is a functional block diagram of the file processing unit. The file processing unit 40 includes a recovery processing unit 41, a file input unit 42a, a file output unit 42b, a file converting unit 43, a file transmitting unit 44, an address book input unit 45, a backup processing unit 46, a backup output unit 47, a setting managing unit 48, a setting file input unit 49a, a setting file output unit 49b, and a connection destination input unit 50. Furthermore, the file processing unit 40 includes an address book management table 410, a backup data storage unit 420, a setting file storage unit 430, and a connection destination management table 440.

Among these elements, the recovery processing unit 41 detects abnormal termination after the electronic blackboard 2 abnormally ends, and recovers unsaved page data. For example, in the case of normal termination, the page data is recorded as a PDF file in the USB memory 5 via the file processing unit 40. However, in the case of abnormal termination such as when the power supply goes down, the page data remains to be recorded in the page data storage unit 300. Therefore, when the power is turned on again, the recovery processing unit 41 restores the page data by reading the page data from the page data storage unit 300.

The file input unit 42a reads the PDF file from the USB memory 5, and stores each page as page data in the page data storage unit 300. The file converting unit 43 converts the page data stored in the page data storage unit 300 into a PDF format file.

The file output unit 42b records, in the USB memory 5, the PDF file output by the file converting unit 43.

The file transmitting unit 44 attaches the PDF file generated by the file converting unit 43, to an e-mail, and transmits the e-mail. The transmission destination of the file is determined by having the display superimposing unit 36 display the contents of the address book management table 410 on the display 3, and having the file transmitting unit 44 accept a selection of the destination that is made as the user operates an input device such as a touch panel. In the address book management table 410, as indicated in FIG. 27, the name of the destination and the e-mail address of the destination are managed in association with each other.

Furthermore, the file transmitting unit 44 can accept input of a mail address as the destination, as the user operates an input device such as a touch panel.

The address book input unit 45 reads the list file of e-mail addresses from the USB memory 5 and manages the list file in the address book management table 410.

The backup processing unit 46 backs up a file output by the file output unit 42*b* and a file transmitted by the file transmitting unit 44, by storing these files in the backup data storage unit 420. If the user does not set the backup, the backup process is not performed. The backup data is stored in a PDF format as indicated in FIG. 28.

The backup output unit 47 stores the backup files in the USB memory 5. When storing the files, a password is input for the purpose of security, by the user's operation of an input device such as a touch panel.

The setting managing unit 48 stores and reads various kinds of setting information of the electronic blackboard 2 in the setting file storage unit 430 to manage this information. Examples of various kinds of setting information include a network setting, a date and time setting, a regional and language setting, a mail server setting, an address book setting, a connection destination list setting, and a setting relating to backup. Note that the network setting is, for example, the setting of the IP address of the electronic blackboard 2, the setting of the net mask, the setting of the default gateway, and the setting of the Domain Name System (DNS), etc.

The setting file output unit 49*b* records various kinds of setting information of the electronic blackboard 2 in the USB memory 5 as a setting file. Note that contents of the setting file cannot be viewed by the user due to security.

The setting file input unit 49*a* reads the setting file stored in the USB memory 5 and applies various kinds of setting information to various settings of the electronic blackboard.

The connection destination input unit 50 reads a list file of connection destination IP addresses of the remote sharing process from the USB memory 5, and manages the list file in the connection destination management table 440. An example of the connection destination management table 440 is indicated in FIG. 29.

The connection destination management table 440 is managed in advance to reduce the trouble of having to input the IP address of the electronic blackboard playing the role of the hosting device, by the user of the participating device, when the electronic blackboard 2 is the participating device to participate in the remote sharing process. In the connection destination management table 440, the name of the site where the electronic blackboard 2, which is the hosting device that can participate, is installed; and the IP address of the electronic blackboard 2, which is the hosting device, are managed in association with each other.

Note that the connection destination management table 440 may not be included. However, in this case, the user of the participating device needs to input the IP address of the hosting device, by using an input device such as a touch panel, in order to start the remote requesting process with the hosting device. Therefore, the user of the participating device acquires the IP address of the hosting device from the user of the hosting device, by telephone or by e-mail, etc.

(Functional Configuration of Communication Control Unit 60)

Next, with reference to FIG. 5, a functional configuration of the communication control unit 60 will be described. FIG. 5 is an example of a functional block diagram of the server unit 90 and the client unit 20. The communication control unit 60 implements control of communication with another one of the electronic blackboards 2 via the communication network 9, and communication with a communication control unit 70 described later in the server unit 90. Therefore, the communication control unit 60 includes a remote start processing unit 61, a remote participation processing unit 62, a remote image transmitting unit 63, a remote image receiving unit 64, a remote operation transmitting unit 65, a remote operation receiving unit 66, and a participation site management table 610.

Among these elements, the remote start processing unit 61 sends, to the server unit 90 of the same electronic blackboard 2, a request to newly start a remote sharing process, and receives a result of the request from the server unit 90. In this case, the remote start processing unit 61 refers to the remote license management table 310, and if license information (product ID, license ID, and expiration date) is managed, the remote start processing unit 61 is able to make a request to start a remote sharing process. However, when the license information is not managed, the remote start processing unit 61 is unable to make a request to start a remote sharing process.

The participation site management table 610 is a table for managing electronic blackboards that are participating devices presently participating in the remote sharing process, when the electronic blackboard is the hosting device. An example of the participation site management table 610 is indicated in FIG. 30.

In the participation site management table 610, the name of the site where the participating electronic blackboard 2 is installed and the IP address of the participating electronic blackboard 2 are managed in association with each other.

The remote participation processing unit 62 sends, via the communication network 9, a participation request to participate in the remote sharing process, to a remote connection request receiving unit 71 in the server unit 90 of the electronic blackboard 2 that is the hosting device which has already started the remote sharing process. Also in this case, the remote participation processing unit 62 refers to the remote license management table 310. Furthermore, when the remote participation processing unit 62 participates in a remote sharing process that has already started, the remote participation processing unit 62 refers to the connection destination management table 440 and acquires the IP address of the electronic blackboard 2 of the participation destination. Note that the remote participation processing unit 62 may not refer to the connection destination management table, and the IP address of the electronic blackboard 2 of the participation destination may be input by the user's operation of an input device such as a touch panel.

The remote image transmitting unit 63 transmits the output image (C) sent from the video acquiring unit 21 via the image acquiring unit 31, to the server unit 90.

The remote image receiving unit 64 receives, from the server unit 90, the image data, which is transmitted from a video output device connected to another electronic blackboard 2, and outputs the image data to the display superimposing unit 36, to enable a remote sharing process.

The remote operation transmitting unit 65 transmits various kinds of operation data necessary for a remote sharing process, to the server unit 90. Examples of various kinds of operation data include addition of a stroke, erasing a stroke, editing (enlargement, reduction, and movement) of a stroke, storage of page data, creation of page data, duplication of page data, erasing page data, and data relating to switching the displayed page, etc. Furthermore, the remote operation receiving unit 66 receives the operation data input at another electronic blackboard 2, from the server unit 90, and outputs the operation data to the image processing unit 30, thereby performing a remote sharing process.

[Functional Configuration of Server Unit]

Next, the functional configuration of the server unit 90 will be described with reference to FIG. 5. The server unit 90 is provided in each electronic blackboard 2, and any of the electronic blackboards 2 can serve as a server unit. Therefore, the server unit 90 includes the communication control unit 70 and a data managing unit 80.

(Functional Configuration of Communication Control Unit 70)

Next, the functional configuration of the communication control unit 70 will be described with reference to FIG. 5.

The communication control unit 70 controls communication between the communication control unit 70 in the client unit 20 in the same electronic blackboard 2, and the communication control unit 70 in the client unit 20 in the other electronic blackboard 2 via the communication network 9. The data managing unit 80 manages operation data and image data, etc.

More specifically, the communication control unit 70 includes the remote connection request receiving unit 71, a remote connection result transmitting unit 72, a remote image receiving unit 73, a remote image transmitting unit 74, a remote operation receiving unit 75, and a remote operation transmitting unit 76.

Among these elements, the remote connection request receiving unit 71 receives a start request for starting a remote sharing process from the remote start processing unit 61, and receives a participation request for participating in the remote sharing process from the remote participation processing unit 62. The remote connection result transmitting unit 72 transmits the result of the start request of the remote sharing process to the remote start processing unit 61, and transmits the result of the participation request for the remote sharing process to the remote participation processing unit 62.

The remote image receiving unit 73 receives the image data (data of the output image (C)) from the remote image transmitting unit 63, and transmits the image data to a remote image processing unit 82 to be described later. The remote image transmitting unit 74 receives the image data from the remote image processing unit 82 and transmits the image data to the remote image receiving unit 64.

The remote operation receiving unit 75 receives operation data (data such as a stroke image (B)) from the remote operation transmitting unit 65, and transmits the operation data to a remote operation processing unit 83 to be described later. The remote operation transmitting unit 76 receives the operation data from the remote operation processing unit 83 and transmits the operation data to the remote operation receiving unit 66.

(Functional Configuration of Data Managing Unit)

Next, with reference to FIG. 5, a functional configuration of the data managing unit 80 will be described. The data managing unit 80 includes a remote connection processing unit 81, the remote image processing unit 82, the remote operation processing unit 83, an operation combination processing unit 84, and a page processing unit 85. Furthermore, the data managing unit 80 includes a passcode managing unit 810, a participation site management table 820, an image data storage unit 830, an operation data storage unit 840, and a page data storage unit 850.

Among these elements, the remote connection processing unit 81 starts a remote sharing process and ends a remote sharing process. Furthermore, based on license information received by the remote connection request receiving unit 71 together with a remote sharing process start request from the remote start processing unit 61, or license information received by the remote connection request receiving unit 71 together with a participation request for participating in a remote sharing process from the remote participation processing unit 62, the remote connection processing unit 81 confirms whether there is a license and whether the present time is within the license period. Furthermore, the remote connection processing unit 81 confirms whether the participation requests from the other electronic blackboards 2 as the client units, exceed a predetermined number of participants that can participate.

Furthermore, the remote connection processing unit 81 determines whether a passcode, which is sent when a participation request for participating in a remote sharing process is made from another electronic blackboard 2, is the same as the passcode managed by the passcode managing unit 810, and if the passcodes are the same, the remote connection processing unit 81 allows the participation in the remote sharing process. Note that the passcode is issued by the remote connection processing unit 81 when a new remote sharing process is started, and the user of the electronic blackboard 2, which is a participating device attempting to participate in the remote sharing process, is notified of the passcode by telephone or electronic mail, etc., from the user of the electronic blackboard 2 serving as the hosting device. Accordingly, the user of the participating device who is attempting to participate in the remote sharing process, will be allowed to participate, by inputting the passcode to the participating device with an input device such as a touch panel to make a participation request. Note that when the usability of the user is to be prioritized over security, confirmation of the passcode may be omitted, and only the license status may be checked.

Furthermore, when the electronic blackboard 2 is the hosting device, the remote connection processing unit 81 stores, in the participation site management table 820 in the server unit 90, the participation site information included in the participation request sent from the remote participation processing unit 62 of the participating device via the communication network 9. Then, the remote connection processing unit 81 reads the remote site information stored in the participation site management table 820, and transmits the remote site information to the remote connection result transmitting unit 72. The remote connection result transmitting unit 72 transmits the remote site information to the remote start processing unit 61 in the client unit 20 of the same hosting device. The remote start processing unit 61 stores the remote site information in the participation site management table 610. Accordingly, in the hosting device, both the client unit 20 and the server unit 90 manage the remote site information.

The remote image processing unit 82 receives image data (output image (C)) from a video output device (the notebook PC 6, etc.) connected to the client unit of each electronic blackboard participating in the remote sharing process (including the client unit 20 of the own electronic blackboard 2 which is the hosting device), and stores the image data in the image data storage unit 830. Also, the remote image processing unit 82 determines the order of displaying the image data to be subjected to the remote sharing process, according to the order of the time of arriving at the server unit 90 of the own electronic blackboard 2 that is the hosting device. Furthermore, the remote image processing unit 82 refers to the participation site management table 820 and transmits the image data in the determined order as described above, to the client units 20 of all the electronic blackboards 2 participating in the remote sharing process (including the client unit of the own electronic blackboard serving as the hosting device), via the communication control unit 70 (the remote image transmitting unit 74).

The remote operation processing unit 83 receives various kinds of operation data such as a stroke image (stroke image (B) etc.), etc., drawn at the client unit of each electronic blackboard 2 participating in the remote sharing process (including the client unit of the own electronic blackboard that is the hosting device), and determines the display order of the images to be subjected to the remote sharing process, in the order of the time of arriving at the server unit 90 of the own electronic blackboard 2 serving as the hosting device. Note that the various kinds of operation data are the same as the various kinds of operation data described above. Furthermore, the remote operation processing unit 83 refers to the participation site management table 820 and transmits the operation data to the client units 20 of all of the electronic blackboards 2 participating in the remote sharing process (including the client unit of the own electronic blackboard serving as the hosting device).

The operation combination processing unit 84 combines the pieces of operation data of the respective electronic blackboards 2 output from the remote operation processing unit 83, and stores operation data as the result of this combination in the operation data storage unit 840, and also returns the operation data to the remote operation processing unit 83. This operation data is transmitted from the remote operation transmitting unit 76 to the client unit of the electronic blackboard that is the hosting device and the client units of the respective electronic blackboards that are the participating devices, such that an image related to the same operation data is displayed on each of the electronic blackboards 2. An example of the operation data is indicated in FIG. 31.

As indicated in FIG. 31, the operation data includes Sequence (SEQ), the operation name of the operation data, the IP address and the Port No. of the client unit (the server unit) of the electronic blackboard 2 that is the transmission source of the operation data, the IP address and the Port No. of the client unit (the server unit) of the electronic blackboard 2 that is the transmission destination of the operation data, the operation type of the operation data, the operation target of the operation data, and data indicating the content of the operation data, managed in association with each other. For example, SEQ 1 indicates that when a stroke has been drawn at the client unit (Port No.: 50001) of the electronic blackboard (IP address: 192.0.0.1) serving as the hosting device, operation data has been transmitted to the server unit (Port No.: 50000) of the electronic blackboard 2 (IP address: 192.0.0.1) that is the same hosting device. In this case, the operation type is "STROKE", the operation target is the page data ID "p005", and the data indicating the content of the operation data is data indicating a stroke. Furthermore, SEQ2 indicates that from the server unit (Port No.:50000) of the electronic blackboard (IP address: 192.0.0.1) serving as the hosting device, operation data has been transmitted to the client unit (Port No.: 50001) of another electronic blackboard (IP address: 192.0.0.1) that is a participating device.

Note that the operation combination processing unit 84 performs the combination in the order in which the operation data is input to the operation combination processing unit 84, and therefore if the communication network 9 is not congested, the stroke image (B) is displayed on the display 3 of all of the electronic blackboards 2 participating in the remote sharing process, in the order of strokes drawn by the users of the respective electronic blackboards 2.

The page processing unit 85 has a function similar to that of the page processing unit 37 in the image processing unit 30 of the client unit 20, and also in the server unit 90, the page data indicated in FIGS. 22 to 24 is stored in the page data storage unit 850. Note that the page data storage unit 850 has the same contents as the page data storage unit 300 in the image processing unit 30, and therefore descriptions thereof are omitted.

<Processes or Operations According to Embodiment>

Figure 7:
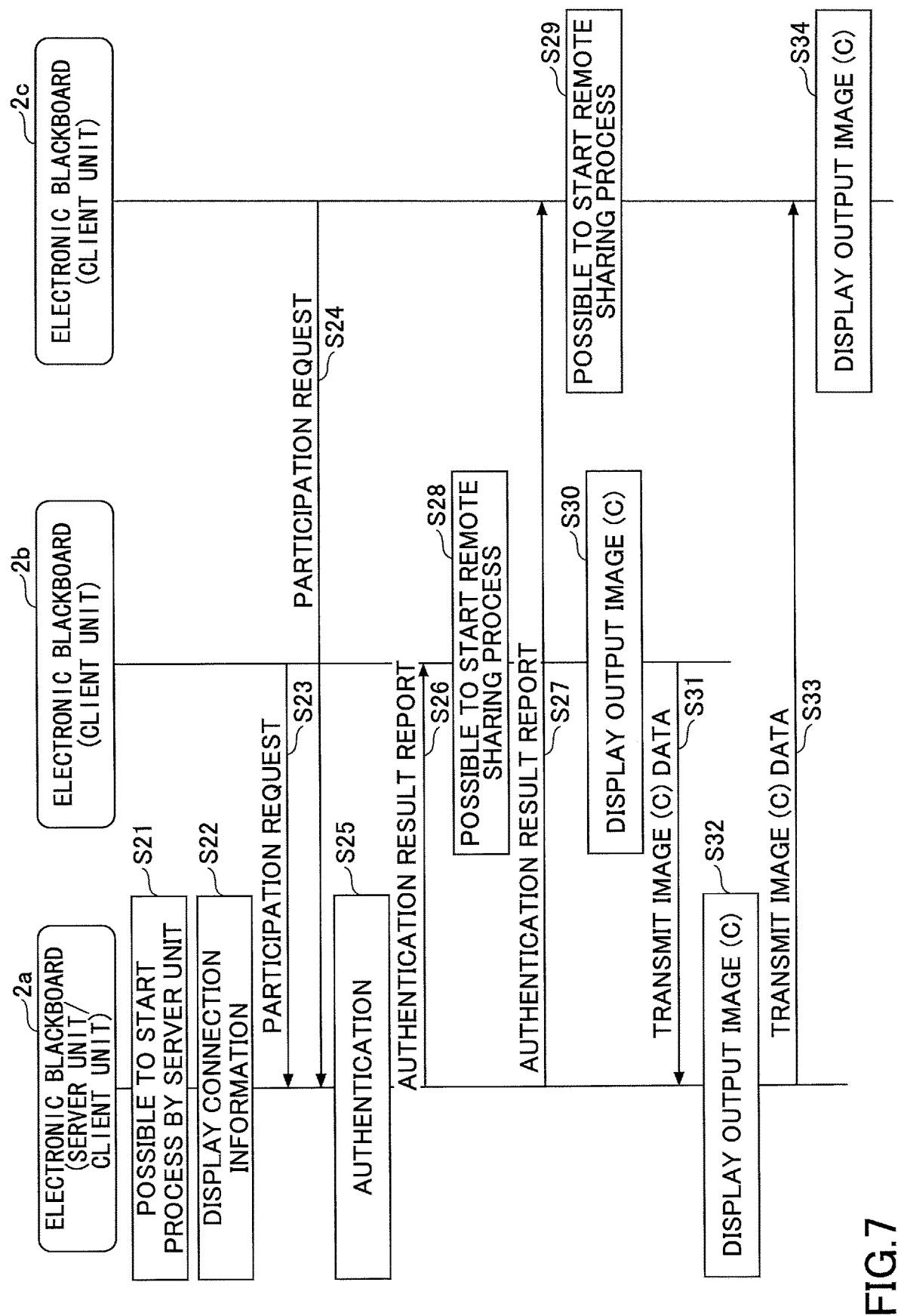
FIG. 7 is an example of a sequence diagram illustrating a process by the electronic blackboards according to an embodiment of the present invention.
Figure 8:
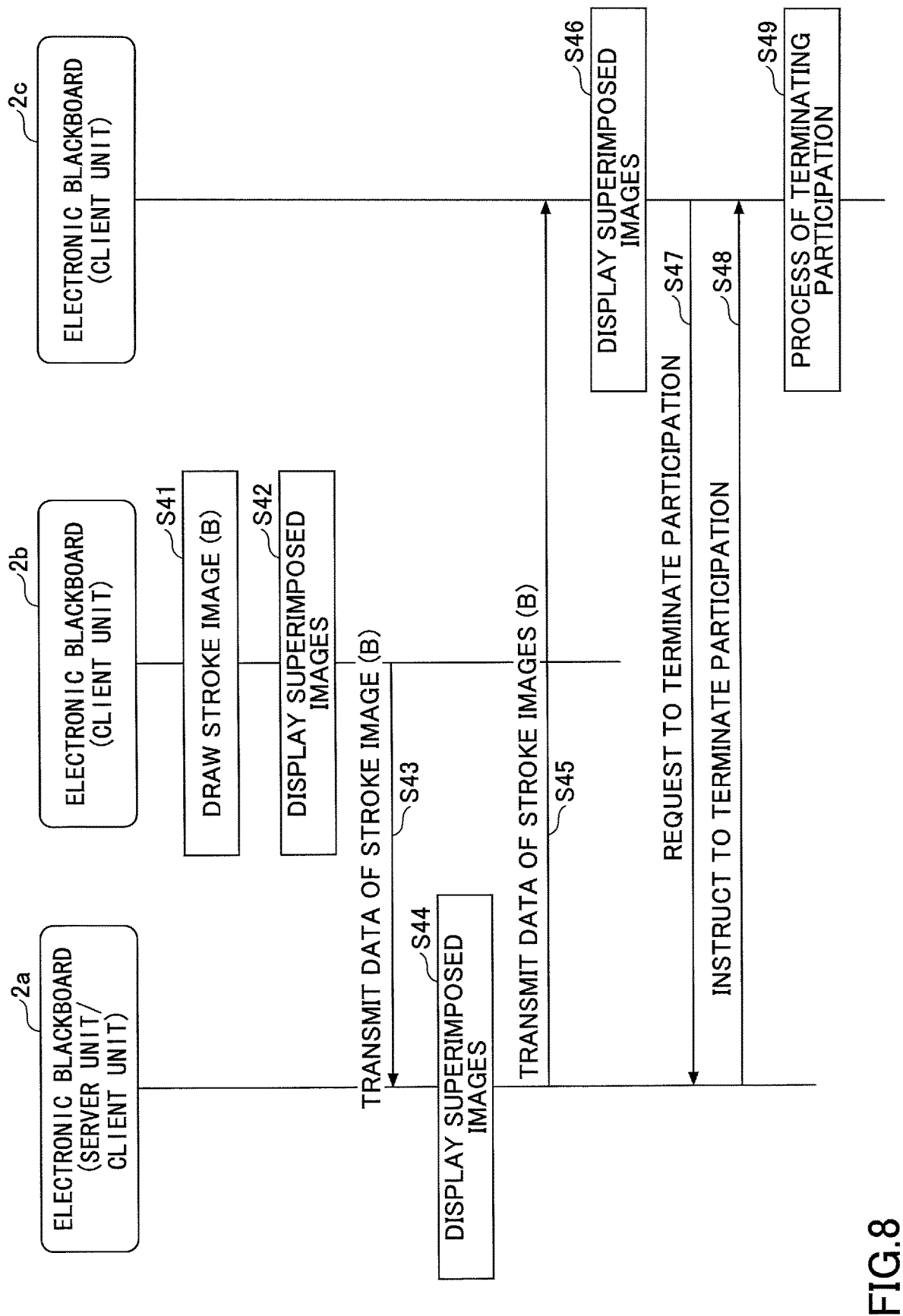
FIG. 8 is an example of a sequence diagram illustrating a process by the electronic blackboards according to an embodiment of the present invention.

Subsequently, with reference to FIGS. 7 and 8, the processes or operations according to the present embodiment will be described. Note that FIGS. 7 and 8 are sequence diagrams illustrating processes of each electronic blackboard. In the embodiment illustrated in FIGS. 7 and 8, a description is given of a case where the electronic blackboard 2a plays a role of a hosting device (server unit and client unit) hosting a remote sharing process, and the electronic blackboards 2b and 2c play a role of a participating device (client unit) participating in the remote sharing process. Furthermore, here, the displays 3a, 3b, and 3c are connected to the electronic blackboards 2a, 2b, and 2c, respectively, and the notebook PCs 6a, 6b, and 6c are also connected to the electronic blackboards 2a, 2b, and 2c, respectively. Furthermore, the electronic pens 4a, 4b, and 4c are used at the electronic blackboards 2a, 2b, and 2c, respectively.

(Participation Process)

First, a process for the electronic blackboards 2b and 2c to participate in the remote sharing process will be described with reference to FIG. 7.

When the user turns on the power switch of the electronic blackboard 2a, the client unit 20 of the electronic blackboard 2a is activated. Then, when the user performs an operation to activate the server unit 90 with an input device such as a touch panel, the remote start processing unit 61 of the client unit 20 outputs an instruction to start a process by the server unit 90, to the remote connection request receiving unit 71 of the server unit 90 of the same electronic blackboard 2a. Accordingly, in the electronic blackboard 2a, not only the client unit 20 but also the server unit 90 can start various processes (step S21).

Next, the UI image generating unit 33 in the client unit 20 of the electronic blackboard 2a generates connection information, which is used for establishing a connection with the electronic blackboard 2a, and the video superimposing unit 28 displays the connection information, which has been obtained from the UI image generating unit 33 via the display superimposing unit 36, on the display 3a (step S22).

This connection information includes the IP address of the hosting device and a passcode generated for the present remote sharing process. In this case, the passcode stored in the passcode managing unit 810 is read by the remote connection processing unit 81 illustrated in FIG. 5, and sequentially transmitted to the remote connection result transmitting unit 72 and the remote start processing unit 61. Furthermore, the passcode is transmitted from the communication control unit 60 including the remote start processing unit 61, to the image processing unit 30 illustrated in FIG. 5, and is finally input to the UI image generating unit 33. Thus, the connection information will include a passcode. Then, the connection information is transmitted to the users of the electronic blackboards 2b and 2c by the user of the electronic blackboard 2a by telephone or electronic mail. Note that when there is the connection destination management table 440, even if the connection information does not include the IP address of the hosting device, the participating device can make a participation request.

Next, in the electronic blackboards 2b and 2c, when the input of the connection information is accepted, according to each user's operation of an input device such as the touch panel, the remote participation processing unit 62 in the client unit 20 of each electronic blackboard 2b and 2c makes a participation request by transmitting the passcode, to the communication control unit 70 in the server unit 90 of the electronic blackboard 2a via the communication network 9, based on the IP address in the connection information (steps S23 and S24). Accordingly, the remote connection request receiving unit 71 of the communication control unit 70 receives the participation request (including the passcode), from each of the electronic blackboards 2b and 2c, and outputs the passcode to the remote connection processing unit 81.

Next, the remote connection processing unit 81 authenticates the passcode received from each electronic blackboard 2b and 2c by using the passcode managed by the passcode managing unit 810 (step S25).

Then, the remote connection result transmitting unit 72 sends a report indicating the authentication result to the client unit 20 of each electronic blackboard 2b and 2c (steps S26 and S27).

When it is determined that each of the electronic blackboards 2b and 2c is a legitimate electronic blackboard by the authentication in step S25, communication of a remote sharing process is established between the electronic blackboard 2a serving as the hosting device and the electronic blackboards 2b and 2c serving as the participating devices, and the remote participation processing unit 62 in the client unit 20 of each electronic blackboard 2b and 2c enables the start of the remote sharing process with the other electronic blackboards (steps S28 and S29).

(Display of Output Image)

Next, a process of displaying the output image (C) in the remote sharing process will be described with reference to FIG. 7.

First, the electronic blackboard 2b displays the output image (C) on the display 3b (step S30). Specifically, the image acquiring unit 31 of the electronic blackboard 2b receives data of the output image (C) displayed on the notebook PC 6b, from the notebook PC 6b via the video acquiring unit 21, and transmits the data of the output image (C) to the display 3b via the display superimposing unit 36 and the video superimposing unit 28, and then the display 3b displays the output image (C).

Next, the image processing unit 30 including the image acquiring unit 31 of the electronic blackboard 2b transmits the data of the output image (C) to the remote image transmitting unit 63, so that the communication control unit 60 including the remote image transmitting unit 63 transmits the data of the output image (C) to the communication control unit 70 of the electronic blackboard 2a serving as the hosting device, via the communication network 9 (step S31). Accordingly, the remote image receiving unit 73 of the electronic blackboard 2a receives the data of the output image (C), and outputs the data to the remote image processing unit 82, so that the remote image processing unit 82 stores the data of the output image (C) in the image data storage unit 830.

Next, the electronic blackboard 2a serving as the hosting device displays the output image (C) on the display 3a (step S32). Specifically, the remote image processing unit 82 of the electronic blackboard 2a outputs the data of the output image (C) received from the remote image receiving unit 73, to the remote image transmitting unit 74. The remote image transmitting unit 74 outputs the data of the output image (C) to the remote image receiving unit 64 in the client unit 20 of the electronic blackboard 2a, which is the same hosting device. The remote image receiving unit 64 outputs the data of the output image (C) to the display superimposing unit 36. The display superimposing unit 36 outputs the data of the output image (C) to the video superimposing unit 28. The video superimposing unit 28 outputs the data of the output image (C) to the display 3a. Accordingly, the display 3a displays the output image (C).

Next, the communication control unit 70 including the remote image transmitting unit 74 in the server unit 90 of the electronic blackboard 2a serving as the hosting device, transmits, via the communication network 9, the data of the output image (C) to the communication control unit 60 of the electronic blackboard 2c other than the electronic blackboard 2b that is the transmission source of the data of the output image (C) (step S33). Accordingly, the remote image receiving unit 64 of the electronic blackboard 2c, which is the participating device, receives the data of the output image (C).

Next, the electronic blackboard 2c displays the output image (C) on the display 3c (step S34). Specifically, the remote image receiving unit 64 of the electronic blackboard 2c outputs the data of the output image (C) received in the step S33, to the display superimposing unit 36 of the electronic blackboard 2c. The display superimposing unit 36 outputs the data of the output image (C) to the video superimposing unit 28. The video superimposing unit 28 outputs the data of the output image (C) to the display 3c. Accordingly, the display 3c displays the output image (C).

When the data of the UI image (A) and the data of the stroke image (B), as well as the data of the output image (C), are input to the video superimposing unit 28, the display superimposing unit 36 generates superimposed images (A, B, C), and the video superimposing unit 28 outputs data of the superposed images (A, B, C) to the display 3c. Also, when the data of a video (E) for the TV conference has been sent from the TV (video) conference terminal 7 to the video superimposing unit 28, the video superimposing unit 28 superimposes the data of the video (E) for the TV conference on the superimposed images (A, B, C) by a picture-in-picture operation, and outputs the superimposed images to the display 3c.

(Display of Superimposed Images)

Next, with reference to FIG. 8, a process of displaying superimposed images in the remote sharing process will be described.

First, at the electronic blackboard 2b, the user draws a stroke image (B) on the electronic blackboard 2b by using the electronic pen 4b (step S41).

Next, as illustrated in FIG. 6, the display superimposing unit 36 of the electronic blackboard 2b superimposes the stroke image (B) on the UI image (A) and the output image (C), and the video superimposing unit 28 displays the superimposed images (A, B, C) on the display 3b of the electronic blackboard 2b (step S42). Specifically, the stroke processing unit 32 of the electronic blackboard 2b receives data of the stroke image (B) as operation data, from the coordinate detecting unit 22 and the contact detecting unit 24 via the event assigning unit 25, and transmits the data to the display superimposing unit 36. Accordingly, the display superimposing unit 36 can superimpose the stroke image (B) on the UI image (A) and the output image (C), and the video superimposing unit 28 can display the superimposed images (A, B, C) on the display 3b of the electronic blackboard 2b.

Next, the image processing unit 30 including the stroke processing unit 32 of the electronic blackboard 2b transmits the data of the stroke image (B) to the remote operation transmitting unit 65, and the remote operation transmitting unit 65 of the electronic blackboard 2b transmits the data of the stroke image (B) to the communication control unit 70 of the electronic blackboard 2a serving as the hosting device, via the communication network 9 (step S43).

Accordingly, the remote operation receiving unit 75 of the electronic blackboard 2a receives the data of the stroke image (B) and outputs the data to the remote operation processing unit 83, so that the remote operation processing unit 83 outputs the data of the stroke image (B) to the operation combination processing unit 84. In this manner, the data of the stroke image (B) drawn at the electronic blackboard 2b is sequentially transmitted to the remote operation processing unit 83 of the electronic blackboard 2a, which is the hosting device, each time drawing is performed. The data of this stroke image (B) is data indicated by each stroke data ID indicated in FIG. 22. Therefore, for example, as described above, when the user draws the alphabetical letter "T" with the electronic pen 4, the letter is written by two strokes, so that the pieces of data of the stroke image (B) indicated by two stroke data IDs are sequentially transmitted.

Next, the electronic blackboard 2a serving as the hosting device displays the superimposed images (A, B, C) including the data of the stroke image (B) sent from the electronic blackboard 2b, on the display 3a (step S44). Specifically, the operation combination processing unit 84 of the electronic blackboard 2a combines the pieces of data of the plurality of stroke images (B) sequentially sent via the remote operation processing unit 83, and stores the combined data in the operation data storage unit 840 and returns the combined data to the remote operation processing unit 83. Accordingly, the remote operation processing unit 83 outputs, to the remote operation transmitting unit 76, the data of the stroke images (B) after the combination, which is received from the operation combination processing unit 84. The remote operation transmitting unit 76 outputs the data of the stroke images (B) after the combination to the remote operation receiving unit 66 of the client unit 20 of the electronic blackboard 2a that is the same hosting device. The remote operation receiving unit 66 outputs the data of the stroke images (B) after the combination to the display superimposing unit 36 in the image processing unit 30. Therefore, the display superimposing unit 36 superimposes the stroke images (B) after the combination on the UI image (A) and the output image (C). Finally, the video superimposing unit 28 displays the superimposed images (A, B, C) superimposed by the display superimposing unit 36, on the display 3a.

Next, the communication control unit 70 including the remote operation transmitting unit 76 in the server unit 90 of the electronic blackboard 2a serving as the hosting device, transmits the data of the stroke images (B) after the combination, via the communication network 9, to the communication control unit 60 of the electronic blackboard 2c other than the electronic blackboard 2b that is the transmission source of the data of the stroke images (B) (step S45). Accordingly, the remote operation receiving unit 66 of the electronic blackboard 2c, which is the participating device, receives the data of the stroke images (B) after the combination.

Next, the electronic blackboard 2c displays the superimposed images (A, B, C) on the display 3c (step S46). Specifically, the remote operation receiving unit 66 of the electronic blackboard 2c outputs the data of the stroke images (B) after the combination received in the step S45, to the image processing unit 30 of the electronic blackboard 2c. The display superimposing unit 36 of the image processing unit 30 superimposes the data of the UI image (A) and the data of the output image (C), with the data of the stroke images (B) after the combination, and outputs the data of the superimposed images (A, B, C) to the video superimposing unit 28. The video superimposing unit 28 outputs the data of the superimposed images (A, B, C) to the display 3c. Accordingly, the display 3c displays the superposed images (A, B, C).

Note that in the above process, the output image (C) is displayed on the display 3; however, the background image (D) may be displayed instead of this output image (C). Alternatively, the exclusive relationship between the output image (C) and the background image (D) may be canceled, and both the output image (C) and the background image (D) may be simultaneously displayed on the display 3.

(End of Participation)

Next, with reference to FIG. 8, a process in which the participating apparatus terminates the participation in the remote sharing process will be described. In the embodiment illustrated in FIG. 8, a process in which the electronic blackboard 2c terminates the participation, is illustrated. First, in the electronic blackboard 2c, upon accepting a request to terminate the participation made by operating an input device such as the touch panel by the user, the remote participation processing unit 62 sends the request to terminate the participation to the communication control unit 70 in the server unit 90 of the electronic blackboard 2a serving as the hosting device (step S47). Accordingly, the remote connection request receiving unit 71 of the communication control unit 70 receives the participation termination request from the electronic blackboard 2c, and outputs the participation termination request together with the IP address of the electronic blackboard 2c, to the remote connection processing unit 81. Then, based on the IP address sent from the remote connection request receiving unit 71, the remote connection processing unit 81 of the electronic blackboard 2a erases, from the participation site management table 820, the IP address of the electronic blackboard 2c that has made the participation termination request and the name of the site where electronic blackboard 2c is installed, and outputs the IP address of the electronic blackboard 2c and a report indicating the erasing, to the remote connection result transmitting unit 72.

Next, the communication control unit 70 including the remote connection result transmitting unit 72 instructs the communication control unit 60 in the client unit 20 of the electronic blackboard 2c, to terminate the participation via the communication network 9 (step S48). Accordingly, the remote participation processing unit 62 of the communication control unit 60 in the electronic blackboard 2c terminates the participation by performing a participation termination process of disconnecting the communication of the remote sharing process (step S49).

<About Events>

Figure 9:
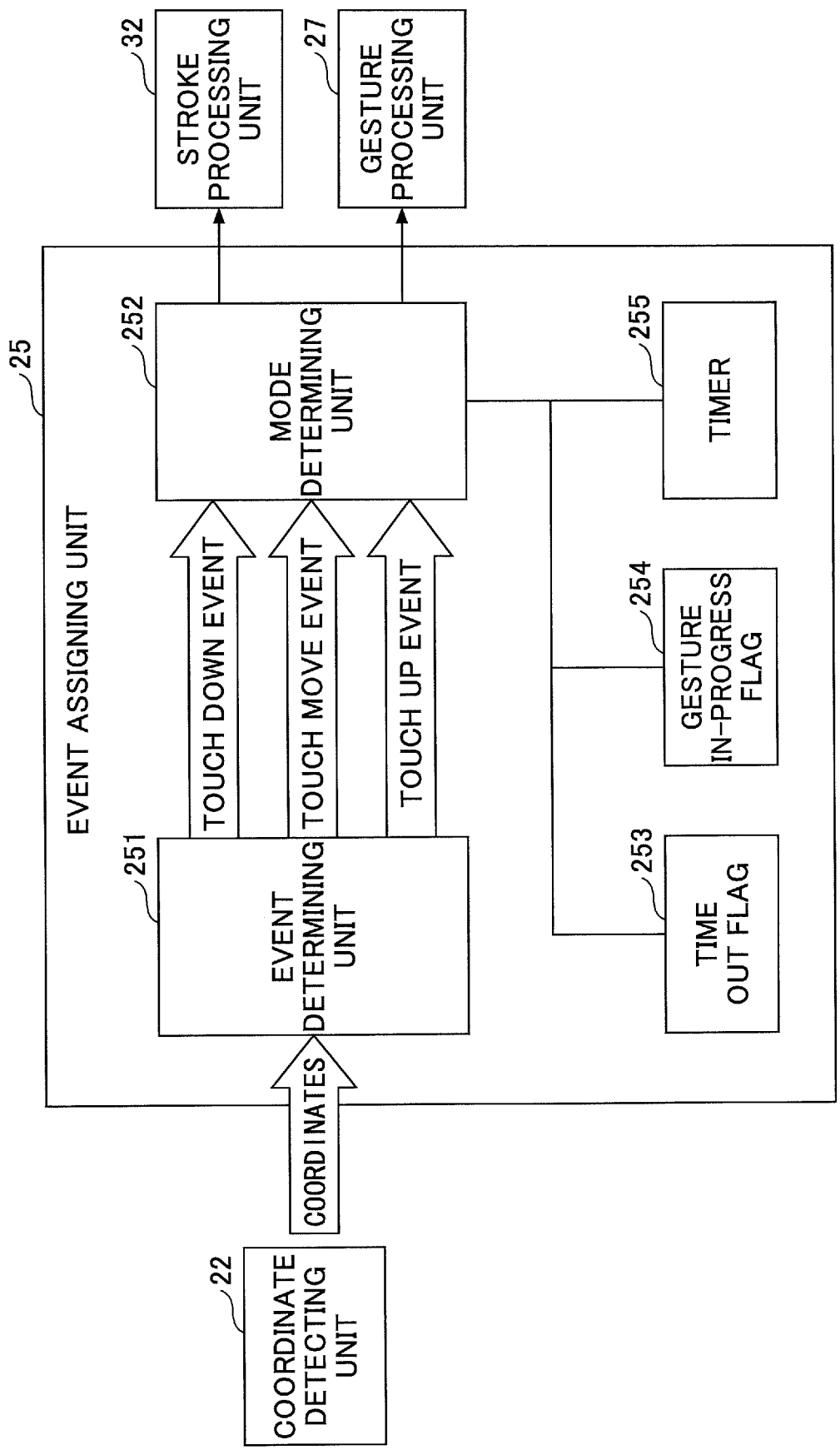
FIG. 9 is an example of a diagram for describing events assigned by an event assigning unit according to an embodiment of the present invention.

FIG. 9 is an example of a diagram for describing events assigned by the event assigning unit. As described above, the event assigning unit 25 assigns an event, which is detected by the coordinate detecting unit 22 and the contact detecting unit 24, into stroke drawing, a UI operation, and a gesture operation. Hereinafter, the operation mode of the electronic blackboard 2 on which the stroke drawing is performed, is referred to as a "handwriting mode", and an operation mode in which a gesture operation is performed, is referred to as a "gesture mode".

The event assigning unit 25 includes an event determining unit 251, a mode determining unit 252, a time out flag 253, a gesture in-progress flag 254, and a timer 255. By using the coordinates detected by the coordinate detecting unit 22, the event determining unit 251 detects the following events.

Touchdown event: The coordinate detecting unit 22 detects the coordinates and outputs the coordinates to the event assigning unit 25; during the time from pen down (detected by the contact sensor 115) to a pen up (no longer detected by the contact sensor 115) of the hand H or the electronic pen 4, the event determining unit 251 assigns one identification number (hereinafter, "ID") to the hand H or the electronic pen 4. This pen down by the hand H or the electronic pen 4 is a touch down event. Hereinafter, the hand H or the electronic pen 4 will be referred to as a coordinate input unit. Different IDs are given to other coordinate input units.

Touch move event: When it is detected that the coordinates, which have been detected as a touch down event, have moved, the event determining unit 251 determines that a touch move event has occurred. The movement of coordinates means that the coordinates detected at a time tn and the coordinates detected at a time tn+1 are within a predetermined range (a distance that the hand H or the electronic pen 4 can move between the time tn and the time tn+1).

Touch up event: When coordinates (coordinate input unit) determined to be a touch down event or a touch move event are no longer detected, the event determining unit 251 detects a touch up event.

The event determining unit 251 sends the determination result of the event and the coordinates to the mode determining unit 252. The mode determining unit 252 determines whether the user is handwriting contents (whether the mode is the handwriting mode) or the user is performing an operation by a gesture (whether the mode is the gesture mode), by a process according to each event to be described later. When the mode determining unit 252 determines that the mode is the handwriting mode, the coordinates are output to the stroke processing unit 32, and when the mode determining unit 252 determines that the mode is the gesture mode, the coordinates are output to the gesture processing unit 27.

Note that in the present embodiment, as a matter of convenience of description, the handwriting mode will be described as an operation mode accepted by the event assigning unit 25 when one set of coordinates has been detected. Furthermore, the handwriting mode is a mode in which a stroke image is drawn. The gesture mode is an operation mode accepted by the event assigning unit 25 when two or more sets of coordinates are simultaneously detected. Furthermore, the gesture mode is a mode in which the user operates a stroke image (B), an output image (C), or a background image (D). For example, according to the gesture mode, it is possible to perform an operation to pinch in (reduce) an image, and an operation to pinch out (enlarge) an image, with two or more fingers, etc. A gesture may also be performed with three or more fingers. As described above, the electronic blackboard 2 according to the present embodiment does not simultaneously accept handwriting by two coordinate input units; however, after it is determined that the mode is not the gesture mode, handwriting can be performed simultaneously by two coordinate input units.

The timer 255 is a time measuring means for measuring a predetermined time. When a second set of coordinates is detected before the timer 255 measures the predetermined time, it is determined that the mode is the gesture mode. The timer 255 may measure the time by software, or may measure the time by hardware such as an integrated circuit (IC), etc., for measuring time. The predetermined time is a general time length from the touching of the first finger to the touching of the second finger, when the user touches the display 3 with two fingers to perform a gesture operation. For example, a predetermined time of several tens of milliseconds to several hundreds of milliseconds is set in the timer 255. However, the time set in the timer 255 may not be fixed; the event determining unit 251 may learn the time from the touching of the first finger to the touching of the second finger when the user performs the gesture operation, and may set the learned time in the timer 255. Furthermore, the user may set a desired predetermined time.

The time out flag 253 is set to True when the timer 255 times out. The gesture in-progress flag 254 is set to True when it is determined that the gesture is in progress. False is set as the initial value for both the time out flag 253 and the gesture in-progress flag 254. The initial value is set when the electronic blackboard 2 is activated.

<Detection Example of Event>

Figure 10:
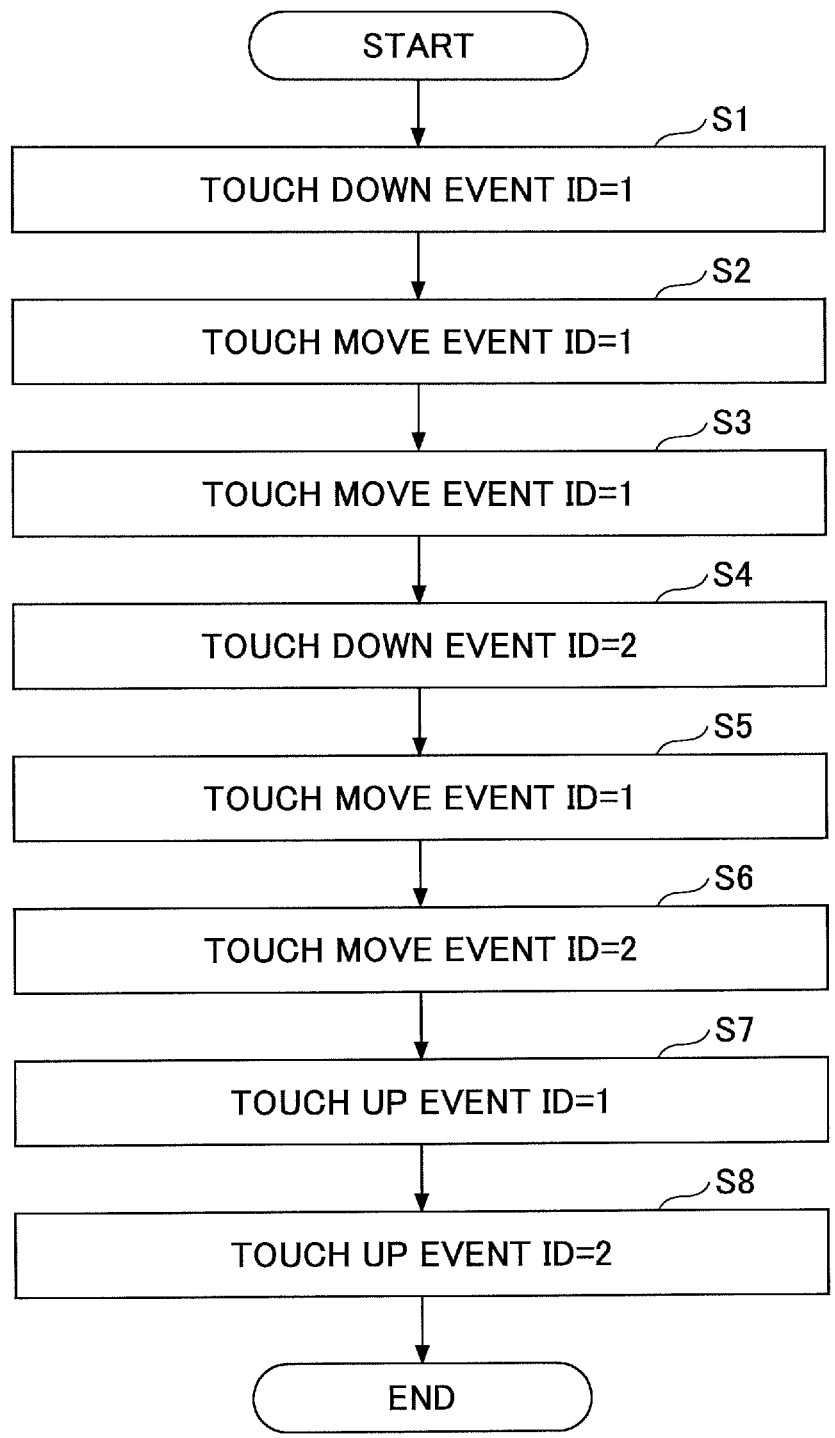
FIG. 10 is a flowchart illustrating an example of events detected by the event assigning unit in time series according to an embodiment of the present invention.

FIG. 10 is a flowchart illustrating an example of events detected by the event assigning unit 25 in time series. FIG. 10 illustrates a case where the user brings two fingers into contact with the display 3 to perform the gesture mode, and two coordinate input units are detected.

Step S1: The event determining unit 251 detects a touch down event. In order to identify the coordinate input unit that has caused the touch down event, the event determining unit 251 assigns ID=1 to this coordinate input unit. A series of coordinates input by the coordinate input unit is identified with ID=1.

Step S2: Next, the event determining unit 251 detects a touch move event. That is, the coordinate input unit has moved. The coordinates generated by the touch move event are used for stroke drawing or a gesture operation.

Step S3: The event determining unit 251 continues to detect the touch move event of ID=1.

Step S4: Next, the event determining unit 251 detects a touch down event different from that of step S1, and assigns ID=2 to this coordinate input unit.

Step S5: The event determining unit 251 continues to detect the touch move event of ID=1.

Step S6: The event determining unit 251 detects a touch move event of ID=2. Note that although many more touch move events are detected in steps S5 and S6, such touch move events are omitted in FIG. 10. In the present embodiment, only one coordinate input unit can perform the handwriting mode, and therefore the coordinates generated by the touch move event of ID=2 are used for the gesture operation (or ignored).

Step S7: The event determining unit 251 detects a touch up event of ID=1. That is, coordinates are no longer detected within a predetermined distance from the coordinates of ID=1 detected last by the coordinate detecting unit 22.

Step S8: The event determining unit 251 detects a touch up event of ID=2. That is, coordinates are no longer detected within a predetermined distance from the coordinates of ID=2 detected last by the coordinate detecting unit 22.

As described above, the event determining unit 251 detects a touch down event, a touch move event, and a touchup event for each of the IDs of the coordinate input units.

First Embodiment

In the present embodiment, the electronic blackboard 2 that waits for a predetermined time period without performing processing, after a touch event is detected, to detect whether the mode is a gesture mode or a handwriting mode, will be described.

<Touch Down Event>

Figure 11A:
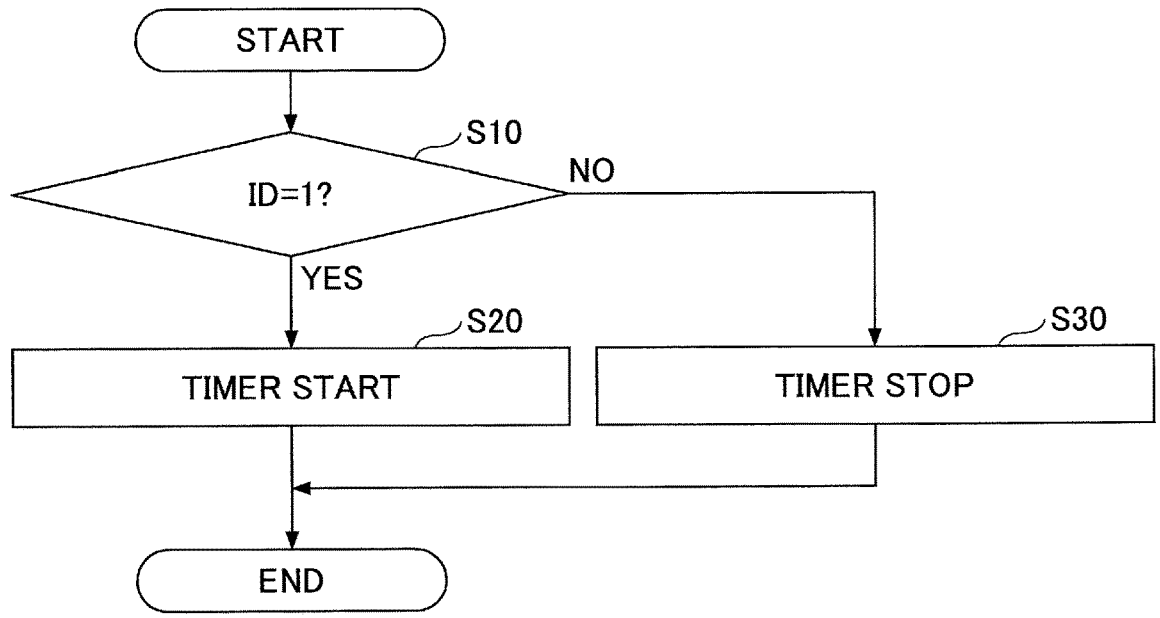
FIG. 11A is an example of a flowchart illustrating a process performed by a mode determining unit when a touch down event is detected according to a first embodiment of the present invention.

FIG. 11A is an example of a flowchart illustrating a process performed by the mode determining unit 252 when a touch down event is detected. The process of FIG. 11A starts when a touch down event is detected.

The mode determining unit 252 determines whether the ID assigned when the touchdown event has been detected, is 1 (step S10). That is, it is determined whether only one coordinate input unit is presently touching the display 3. It may be determined whether the number of IDs assigned and monitored by the event determining unit 251, is 1.

When the determination in step S10 is YES, the mode determining unit 252 starts the timer 255 (step S20). A predetermined time is measured by this timer 255.

When the determination in step S10 is NO, the mode determining unit 252 stops the timer 255 (step S30). That is, the touch down event is detected as an event of a second coordinate input unit, and therefore the timer 255 is stopped and the measurement time up to this point is determined. Note that when a third touchdown event is detected, the timer 255 has already been stopped.

As described above, when the detected touch down event is of the first coordinate input unit, the mode determining unit 252 can start the timer 255.

<At Time Out>

Figure 12:
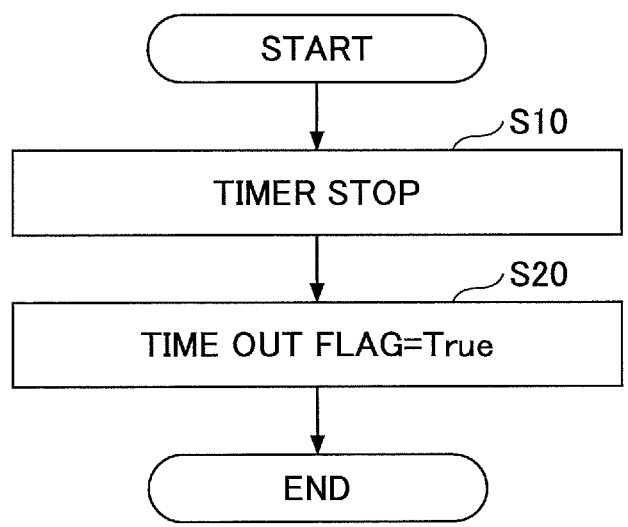
FIG. 12 is an example of a flowchart illustrating a process performed by the mode determining unit at the time out according to the first embodiment of the present invention.

FIG. 12 is an example of a flowchart illustrating a process performed by the mode determining unit 252 at the time out. The process in FIG. 12 starts when the timer 255 times out.

When the timer 255 times out, the mode determining unit 252 stops the timer 255 (step S10). When the timer 255 times out, it means that the measurement of the predetermined time period has been ended.

Next, the mode determining unit 252 sets the time out flag 253 to True (step S20). The fact that the time out flag 253 is set to True means that the timer 255 has timed out.

As described above, when the timer 255 times out, the mode determining unit 252 can set the time out flag 253 to True.

<Touch Move Event>

Figure 13A:
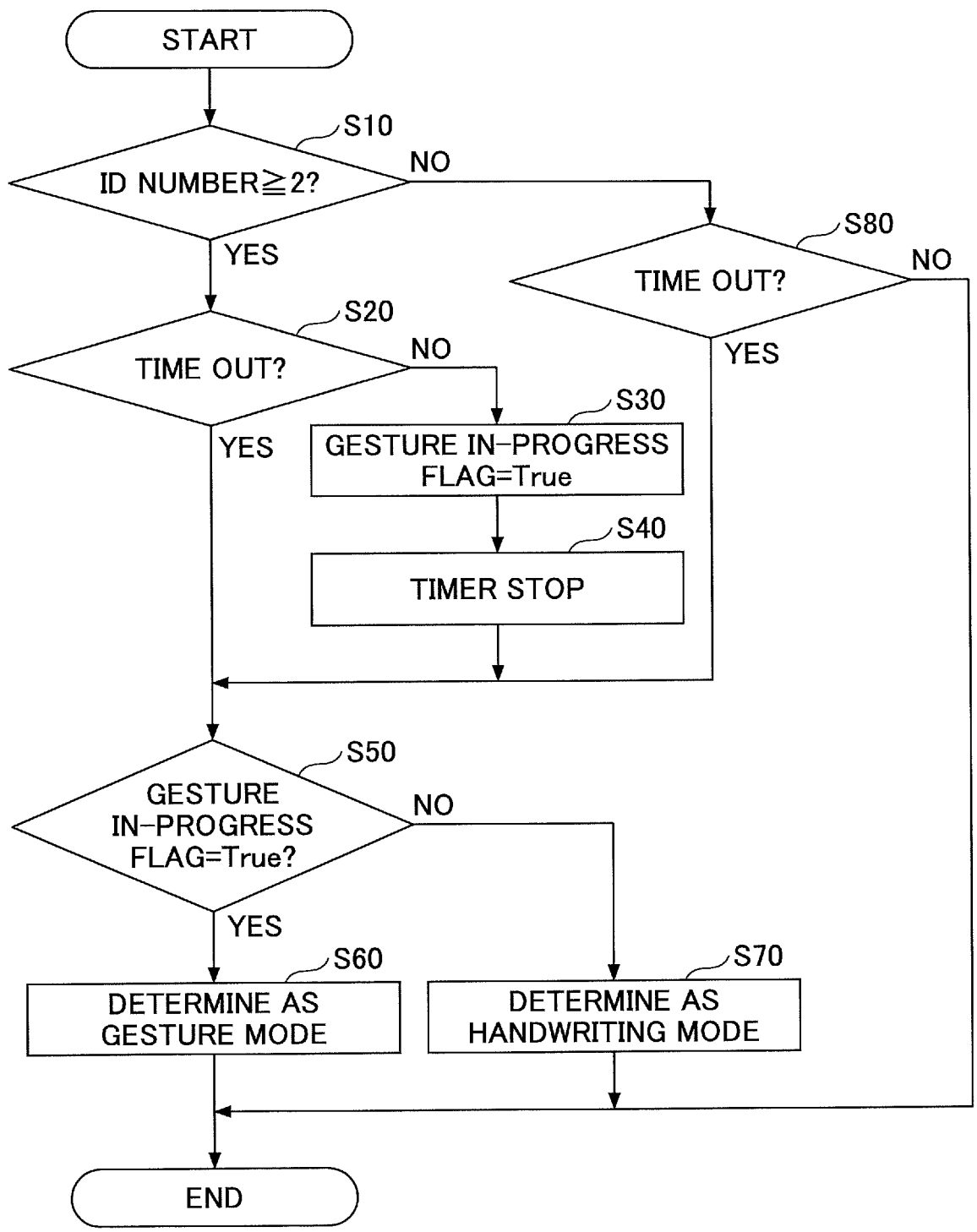
FIG. 13A is an example of a flowchart illustrating a process performed by the mode determining unit when a touch move event is detected according to the first embodiment of the present invention.

FIG. 13A is an example of a flowchart illustrating a process performed by the mode determining unit 252 when a touch move event is detected. The process in FIG. 13A starts when a touch move event is detected.

The mode determining unit 252 determines whether the ID number is 2 or more (step S10). When the determination in step S10 is NO, the mode determining unit 252 determines whether time out has occurred (step S80). That is, the mode determining unit 252 determines whether the timeout flag is set to True. There is only one coordinate input unit, and therefore the mode determining unit 252 determines whether a predetermined time has elapsed, depending on whether time out has occurred.

When timeout has not occurred (NO in S80), the process in FIG. 13A ends and the mode determining unit 252 does not output any coordinates to the stroke processing unit 32.

When time out has occurred (YES in S80), the process proceeds to step S50.

When the determination in step S10 is YES, the mode determining unit 252 determines whether the timer 255 has timed out (step S20). That is, the mode determining unit 252 determines whether the timeout flag is set to True.

When the determination in step S20 is NO, the mode determining unit 252 sets the gesture in-progress flag 254 to True (step S30). That is, the second coordinate input unit has been detected before the timer 255, which has started by the touch down event, times out, and therefore the mode determining unit 252 determines that the mode is the gesture mode. It is considered that the user has touched the display 3 with two fingers with a slight time difference between the two fingers (within the predetermined time period).

Furthermore, the mode determining unit 252 stops the timer 255 (step S40). That is, it is determined that the mode is the gesture mode, and therefore the time measurement by the timer 255 becomes unnecessary.

In step S50, the mode determining unit 252 determines whether the gesture in-progress flag 254 is set to True (step S50). First, when it is determined as YES in step S20 (when time out has occurred), the gesture in-progress flag 254 is still set to False (when the second coordinate input unit is not detected within a predetermined time, the gesture in-progress flag 254 is to False), and therefore it is determined as NO in step S50, and the mode determining unit 252 determines that the mode is the handwriting mode, and outputs the coordinates input by the first coordinate input unit to the stroke processing unit 32 (step S70). The coordinates input by the second coordinate input unit are recorded, but are not used for stroke drawing. However, obviously, the coordinates input by the second coordinate input unit may be used for stroke drawing.

When it is determined in step S20 that time out has not occurred, the gesture in-progress flag 254 is set to True, and therefore it is determined as YES in step S50, and the mode determining unit 252 determines that the mode is the gesture mode (step S60). That is, when the second set of coordinates are detected within a predetermined time from the touch down event, the mode determining unit 252 can determine that the mode is the gesture mode.

When it is determined as YES in step S80, even though time out has occurred with only one coordinate input unit, the gesture in-progress flag 254 is set to False, and therefore the mode determining unit 252 determines that the mode is the handwriting mode (step S70).

Therefore, according to the process illustrated in FIG. 13A, even if the user inputs a second set of coordinates after the time out, the gesture operation cannot be performed. Therefore, even when the user is touching the display with a single finger and another finger or the sleeve of the user's clothes touches the display, it is possible to avoid making an erroneous determination that the electronic blackboard 2 is in the gesture mode.

Furthermore, the electronic blackboard 2 cannot determine that the mode is the handwriting mode until a predetermined time has elapsed, and therefore it is possible to avoid a situation where a handwritten line is drawn when the first finger touches the display when the user had intended to make a gesture operation.

<Touch Up Event>

Figure 14:
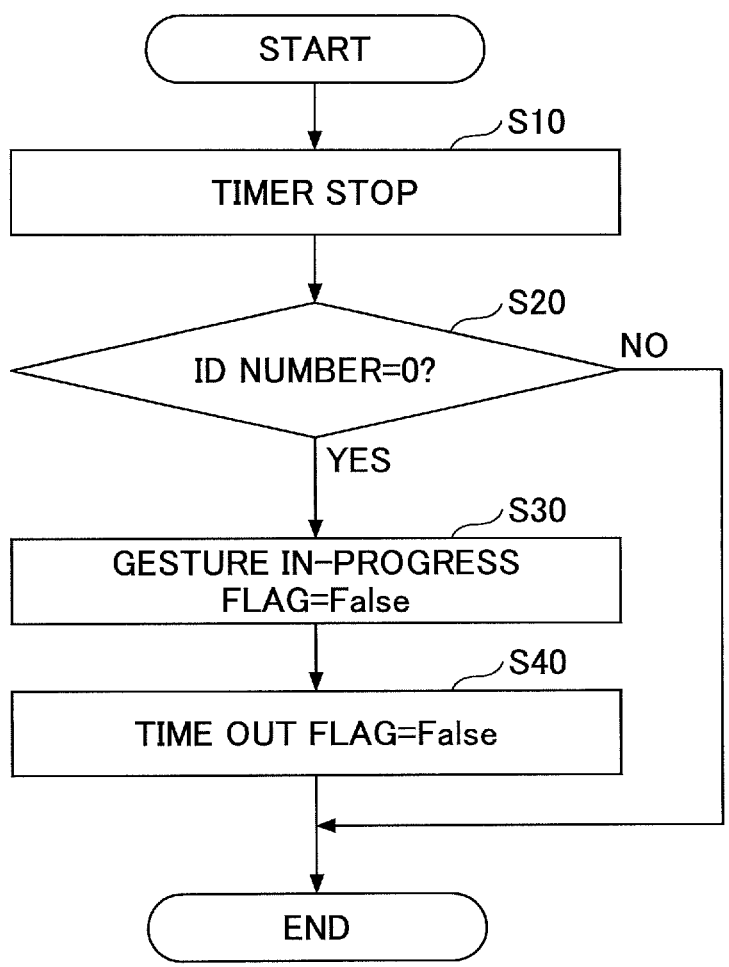
FIG. 14 is an example of a flowchart illustrating a process performed by the mode determining unit when a touch up event is detected according to the first embodiment of the present invention.

FIG. 14 is an example of a flowchart illustrating a process performed by the mode determining unit 252 when a touch up event is detected. The process of FIG. 14 starts when a touch up event is detected.

The mode determining unit 252 stops the timer 255 upon detecting a touch up event (step S10). This is because it is no longer necessary to measure the time. The timer 255 may be stopped before the touch up event.

Next, the mode determining unit 252 determines whether the number of IDs is zero (step S20).

When the number of IDs is zero (YES in S20), this means that all of the coordinate input units have separated from the display 3, so the mode determining unit 252 initializes the gesture in-progress flag 254 and the time out flag 253 (steps S30 and S40).

Note that when the user has separated one finger from the display 3 during the gesture, and the second finger is brought into contact with the display 3 again, time out has already occurred and the gesture in-progress flag is set to True, and therefore the gesture mode is continued.

According to the process of FIG. 14, when a touch up event is detected, the mode determining unit 252 can initialize the gesture in-progress flag 254 and the time out flag 253.

As described above, the electronic blackboard according to the present embodiment waits for a predetermined time period without performing processing when the first touch down event is detected. The, when a second set of coordinates is detected within a predetermined time, the electronic blackboard determines that a gesture is made. If a second set of coordinates is not detected within the predetermined time, the electronic blackboard determines that handwriting is performed. Accordingly, the mode determining unit 252 can determine whether the mode is the handwriting mode or the gesture mode without any explicit operations by the user. Furthermore, it is possible to avoid a situation of erroneously determining that the electronic blackboard 2 is in the gesture mode although the electronic blackboard 2 is not in the gesture mode, or erroneously determining that the electronic blackboard 2 is in the handwriting mode although the electronic blackboard 2 is not in the handwriting mode.

Modified Example

Figure 11B:
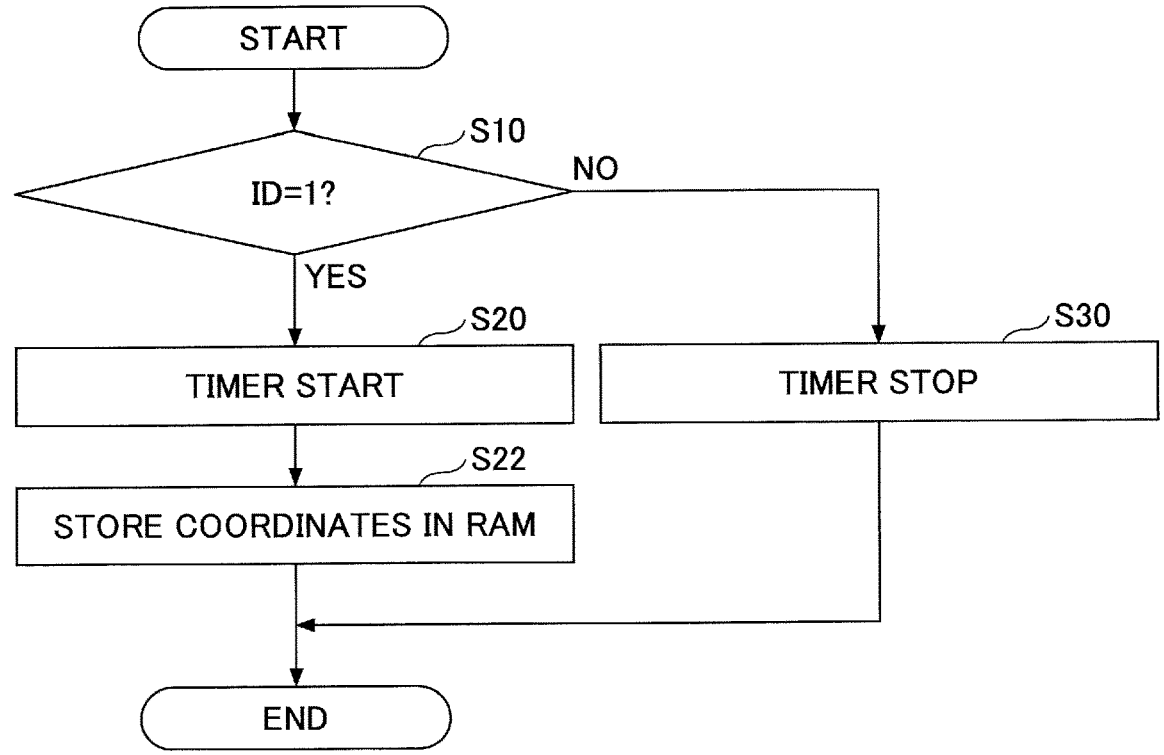
FIG. 11B is another example of a flowchart illustrating a process performed by a mode determining unit when a touch down event is detected according to the first embodiment of the present invention.
Figure 13B:
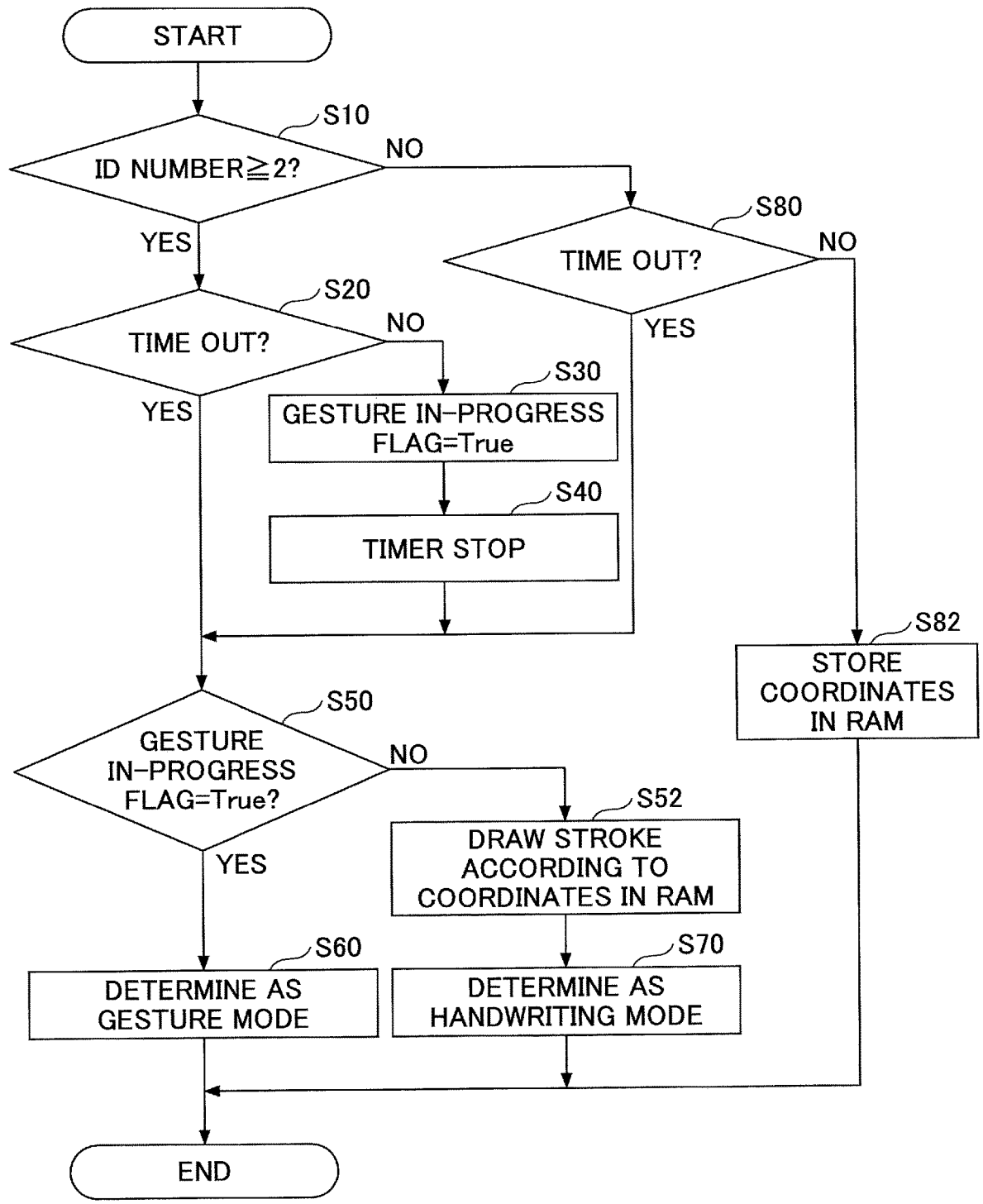
FIG. 13B is another example of a flowchart illustrating a process performed by the mode determining unit when a touch move event is detected according to the first embodiment of the present invention.

Note that stroke drawing may be performed with coordinates held in advance, after the mode is determined to be the handwriting mode. In this case, as illustrated in FIG. 11B, after step S20, the coordinates are stored in the RAM 103 (step S22). Then, as illustrated in FIG. 13B, the coordinates are stored in the RAM 103 also during the touch move event (step S82). When it is determined in step S50 of FIG. 13B that the mode is not the gesture mode, the stroke processing unit 32 displays the coordinates in the RAM 103 on the display 3 (step S52). In this case, a stroke is not displayed until a predetermined time elapses, but when a predetermined time elapses, the electronic blackboard 2 can display the contents handwritten by the user in the past.

Second Embodiment

In the first embodiment, the stroke drawing is not performed until the timer 255 times out, and therefore there is a risk that the user may perceive that the starting of handwriting is delayed. Therefore, in the present embodiment, the electronic blackboard 2 that proceeds with stroke drawing before the time out, even if the timer 255 has not timed out when a touch down event is detected, will be described. The electronic blackboard 2 proceeds with stroke drawing before the time out, and therefore the electronic blackboard 2 can perform the stroke drawing immediately after the user touches the display 3.

Figure 15:
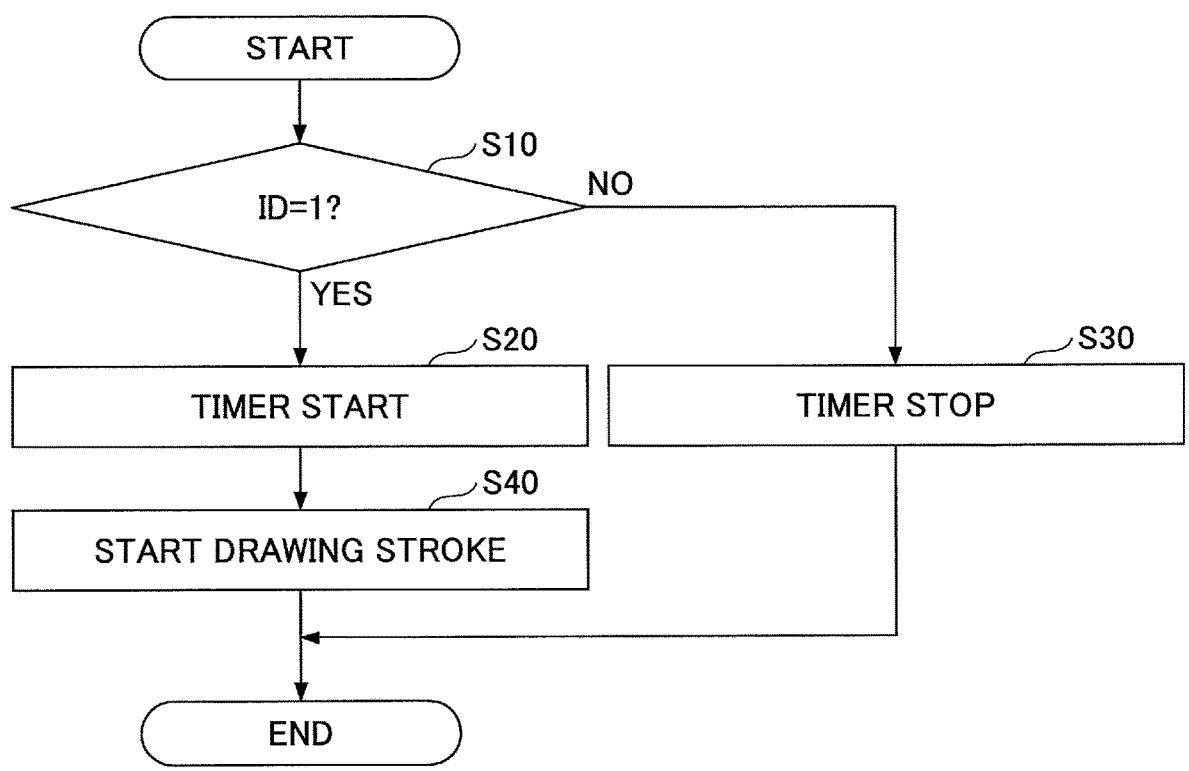
FIG. 15 is an example of a flowchart illustrating a process performed by the mode determining unit when a touch down event is detected according to a second embodiment of the present invention.

Note that in the present embodiment, the process at the time out and the process when a touch up event is detected are the same as in the first embodiment.
<Touch Down Event>
FIG. 15 is an example of a flowchart illustrating a process performed by the mode determining unit 252 when a touch down event is detected. Note that in FIG. 15, the differences from FIG. 11A will mainly be described.

Figure 16:
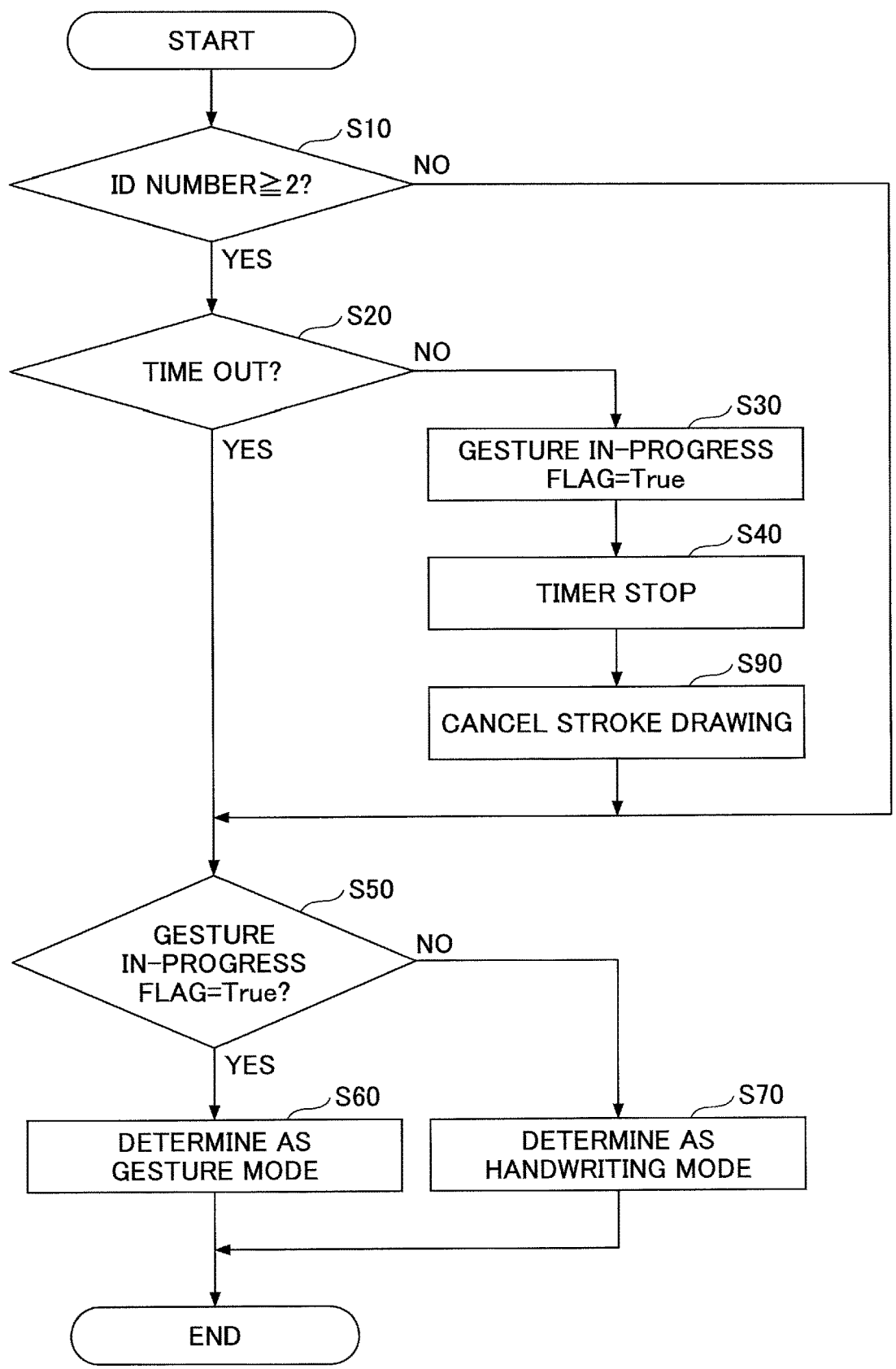
FIG. 16 is an example of a flowchart of a process performed by a stroke processing unit when a touch move event is detected according to the second embodiment of the present invention.

When the timer 255 is started in step S20, the mode determining unit 252 outputs coordinates to the stroke processing unit 32, and causes the stroke processing unit 32 to start stroke drawing (step S40). That is, it is provisionally determined that the mode is the handwriting mode. The stroke drawing is started before the predetermined time elapses, and therefore the electronic blackboard 2 can perform the stroke drawing immediately after the user touches the display 3.
<Touch Move Event>
FIG. 16 is an example of a flowchart of a process performed by the stroke processing unit 32 when a touch move event is detected. Note that in FIG. 16, the differences from FIG. 13A will mainly be described. In FIG. 16, the process of step S80 becomes unnecessary, and step S90 is added.

As described with reference to FIG. 15, when a touch down event is detected, the stroke processing unit 32 performs stroke drawing before time out occurs. Therefore, if the second coordinate input unit is detected before the time out, it is necessary to erase the stroke that is already drawn.

Therefore, when the determination in step S20 is NO, the mode determining unit 252 determines to erase the stroke (step S90). Specifically, the mode determining unit 252 causes the stroke processing unit 32 to erase the coordinates stored in the page data storage unit 300 and associated with ID=1, and to also erase these coordinates from the display 3. That is, when it is determined that the electronic blackboard 2 is in the gesture mode, it is possible to erase a stroke that has already been drawn.

On the other hand, when a second set of coordinates is detected after the time out (YES in step S20), the stroke is not erased, and therefore a stroke, which has been intentionally handwritten by the user, does not disappear.

Therefore, according to the electronic blackboard 2 according to the present embodiment, in addition to the effect of the first embodiment, the electronic blackboard 2 proceeds with stroke drawing before the time out, and therefore the stroke drawing can be performed immediately after the user touches the display 3. Furthermore, when it is determined that the electronic blackboard 2 is in the gesture mode, the drawn stroke can be erased.

Third Embodiment

The electronic blackboard 2 may include another mode in addition to the gesture mode and handwriting mode. This other mode is a mode explicitly selected by the user; even in a state where the other mode is selected, the user can perform operations with gestures. Therefore, in a state where the other mode is selected by the user, it is necessary to determine whether the electronic blackboard 2 is to perform a process based on the other mode or the gesture mode.

Figure 17A:
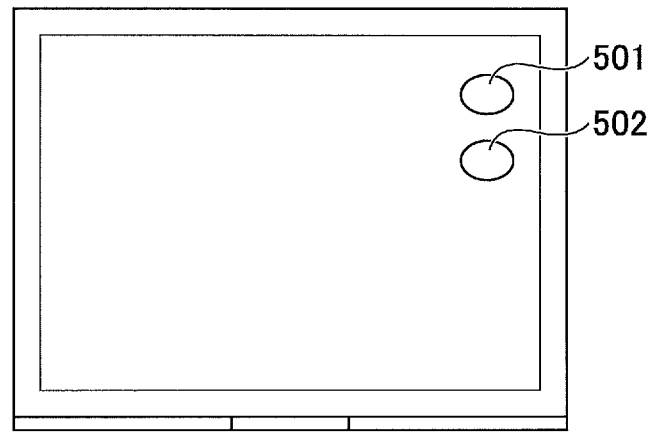
FIG. 17A is an example of a diagram schematically illustrating menus displayed on the display, in which a one-touch input button and an eraser button are displayed according to a third embodiment of the present invention.

First, another mode will be described with reference to FIGS. 17A, 17B, and 17C. FIGS. 17A, 173, and 17C are diagrams schematically illustrating menus displayed on the display 3. In FIG. 17A, a one-touch input button 501 and an eraser button 502 are displayed. In reality, more buttons may be displayed; however, such buttons are omitted in FIGS. 17A, 17B, and 17C. Note that the event assigning unit 25 detects that the one-touch input button 501 or the eraser button 502 has been pressed based on coordinates, and the operation processing unit 26 notifies the stroke processing unit 32 that the mode is another mode. Accordingly, a function corresponding to the one-touch input button 501 or the eraser button 502 is activated.

Figure 17B:
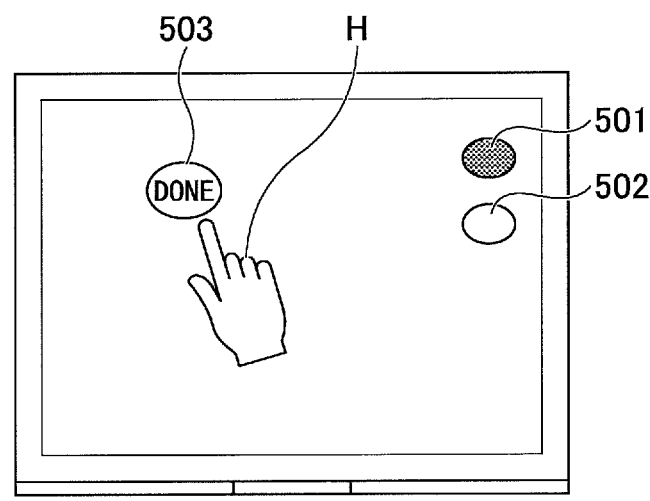
FIG. 17B is an example of a diagram schematically illustrating menus displayed on the display, in which an operation performed when the user presses the one-touch input button is displayed according to the third embodiment of the present invention.

FIG. 17B illustrates an operation of the electronic blackboard 2 when the user presses the one-touch input button 501 with the coordinate input unit. When the user presses the one-touch input button 501, a plurality of design characters are displayed. The user selects any design character and specifies the position where the design character is to be displayed, by the coordinate input unit. The stroke processing unit 32 has been informed that the one-touch input button 501 has been pressed, and therefore the stroke processing unit 32 causes the design character to be displayed at the coordinates specified by the user. In FIG. 17B, a design character 503 in which characters "DONE" are surrounded by a circle, is displayed. Note that as the design character 503, there are many types of characters designed based on various symbols, such as "CONFIDENTIAL", a triangle, a star, a number, and an alphabetical letter, etc.

FIG. 17C illustrates the operation of the electronic blackboard 2 when the user presses the eraser button 502 with the coordinate input unit. When the user presses the eraser button 502, the user can erase a stroke 504 that has already been drawn. It is assumed that the user has pressed the eraser button 502 in a state where the stroke 504 of FIG. 17C has been drawn. The user traces the stroke 504 that is already drawn, by the coordinate input unit. The stroke processing unit 32 has been notified that the eraser button 502 has been pressed, and therefore the stroke processing unit 32 erases the stroke 504 based on the coordinates. That is, the stroke processing unit 32 searches the page data storage unit 300 for the stroke 504 having coordinates close to the coordinates detected by the coordinate detecting unit 22, and erases the stroke 504 from the page data storage unit 300. Furthermore, the stroke 504 based on the erased coordinates, is erased from the display 3. Note that the eraser button 502 has a function of erasing the entire stroke 504 by the user touching one point on or near the stroke 504 with the coordinate input unit.

As described above, even after the one-touch input button 501 or the eraser button 502 is pressed, the electronic blackboard 2 has to determine whether the user is going to perform a gesture operation, one-touch input, or an eraser operation. Consideration is given to a case where while the one-touch input button 501 is pressed, the electronic blackboard 2 displays the design character 503 immediately after the touch down event as in the handwriting mode of the second embodiment, and subsequently, when it is determined that the mode is the gesture mode, the design character is erased. In this case, the design character 503 is displayed for only a moment from the viewpoint of the user, and therefore there is a risk that the user may perceive a feeling of strangeness. On the other hand, even if the design character 503 is displayed after a predetermined time period elapses after the touch down, unlike the stroke 504, there is less risk that the user feels that the display is slow.

Furthermore, consideration is given to a case where while the eraser button 502 is pressed, the electronic blackboard 2 erases the stroke 504 immediately after the touch down event as in the handwriting mode of the second embodiment, and subsequently, it is determined that the mode is the gesture mode. In this case, it becomes difficult to restore the coordinates once erased from the page data storage unit 300.

Due to the reasons described above, when the one-touch input button 501 or the eraser button 502 is pressed, it is preferable that the electronic blackboard 2 displays the design character 503 or erases the stroke 504 after confirming that the mode is not the gesture mode (after time out). Such processes will be described below. Note that in the following description, the operation mode of a state where the one-touch input button 501 or the eraser button 502 is pressed, is referred to as a "stamp mode".

<Touch Down Event>

Figure 18:
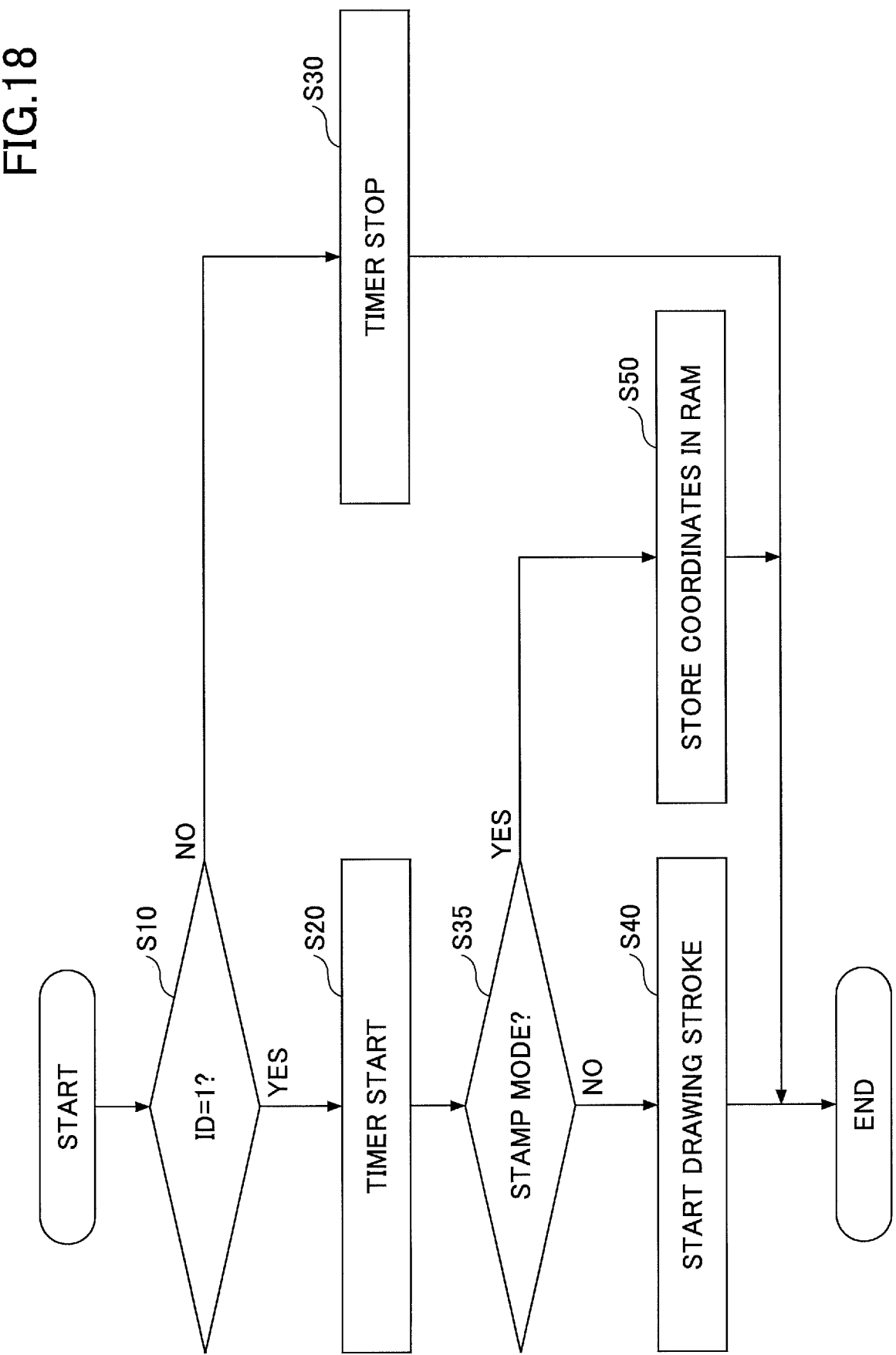
FIG. 18 is an example of a flowchart illustrating a process performed by the mode determining unit when a touch down event is detected according to the third embodiment of the present invention.

FIG. 18 is an example of a flowchart illustrating a process performed by the mode determining unit 252 when a touch down event is detected. Note that in FIG. 18, the differences from FIG. 15 according to the second embodiment will mainly be described.

When the timer 255 is started in step S20, the mode determining unit 252 determines whether the mode is the stamp mode (step S35). That is, the mode determining unit 252 determines whether the one-touch input button 501 or the eraser button 502 has been pressed.

When the mode is not the stamp mode (NO in step S35), the mode determining unit 252 sends the coordinates to the stroke processing unit 32 (step S40) as in the second embodiment. Accordingly, the stroke processing unit 32 can perform stroke drawing. The stroke drawing is started before the predetermined time elapses, and therefore the electronic blackboard 2 can perform the stroke drawing immediately after the user touches the display 3.

When the mode is the stamp mode (YES in S35), the mode determining unit 252 stores the coordinates in the RAM 103, etc. (step S50). By storing the coordinates, the stroke processing unit 32 can display the design character 503 or erase the stroke 504 at the position indicated by the coordinates after the elapse of the predetermined time.

<Time Out Process>

Figure 19:
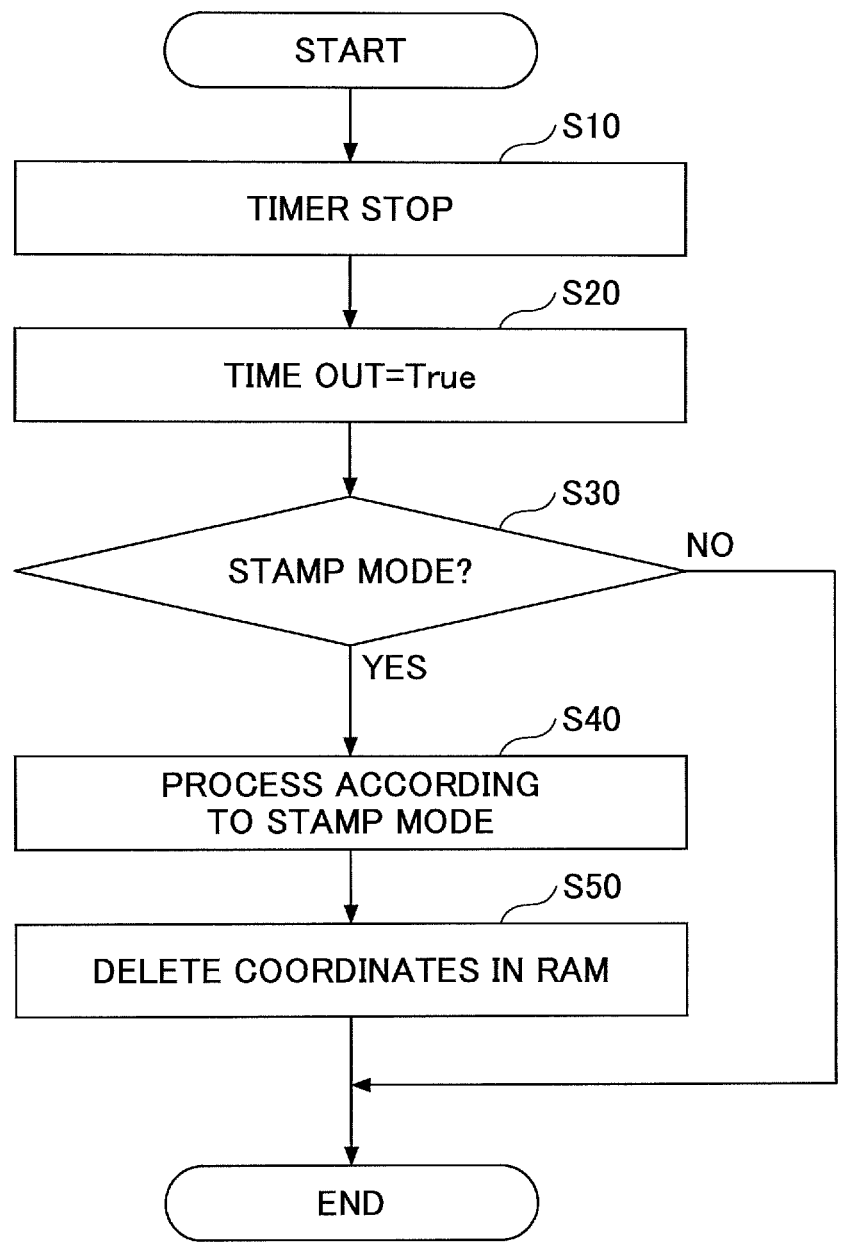
FIG. 19 is an example of a flowchart illustrating a process performed by the mode determining unit at the time out according to the third embodiment of the present invention.

FIG. 19 is an example of a flowchart illustrating a process performed by the mode determining unit 252 at the time out. In FIG. 19, the differences from FIG. 12 will mainly be described.

In step S20, when the mode determining unit 252 sets the time out flag 253 to True, the mode determining unit 252 determines whether the mode is the stamp mode (step S30).

When the mode is not the stamp mode (NO in S30), the process of FIG. 19 ends. That is, the coordinates are drawn as a stroke, and therefore the mode determining unit 252 does nothing at the time out.

When the mode is the stamp mode (YES in S30), the mode determining unit 252 sends the coordinates stored in the RAM 103 to the stroke processing unit 32, and requests a process corresponding to the stamp mode (step S40). Therefore, the stroke processing unit 32 displays the design character 503 at the coordinates stored last in the RAM 103, or erases the stroke at the coordinates stored in the RAM 103. That is, immediately after the timer 255 times out, a process according to the stamp mode becomes possible.

Then, the coordinates stored in the RAM 103 become unnecessary, and therefore the mode determining unit 252 erases the coordinates stored in the RAM 103 (step S50). Therefore, it is possible to avoid a situation where the RAM 103 is overloaded with data.

Accordingly, immediately after the time out, the stroke processing unit 32 can perform a process according to the stamp mode based on the coordinates stored in the RAM 103.

<Touch Move Event>

Figure 20:
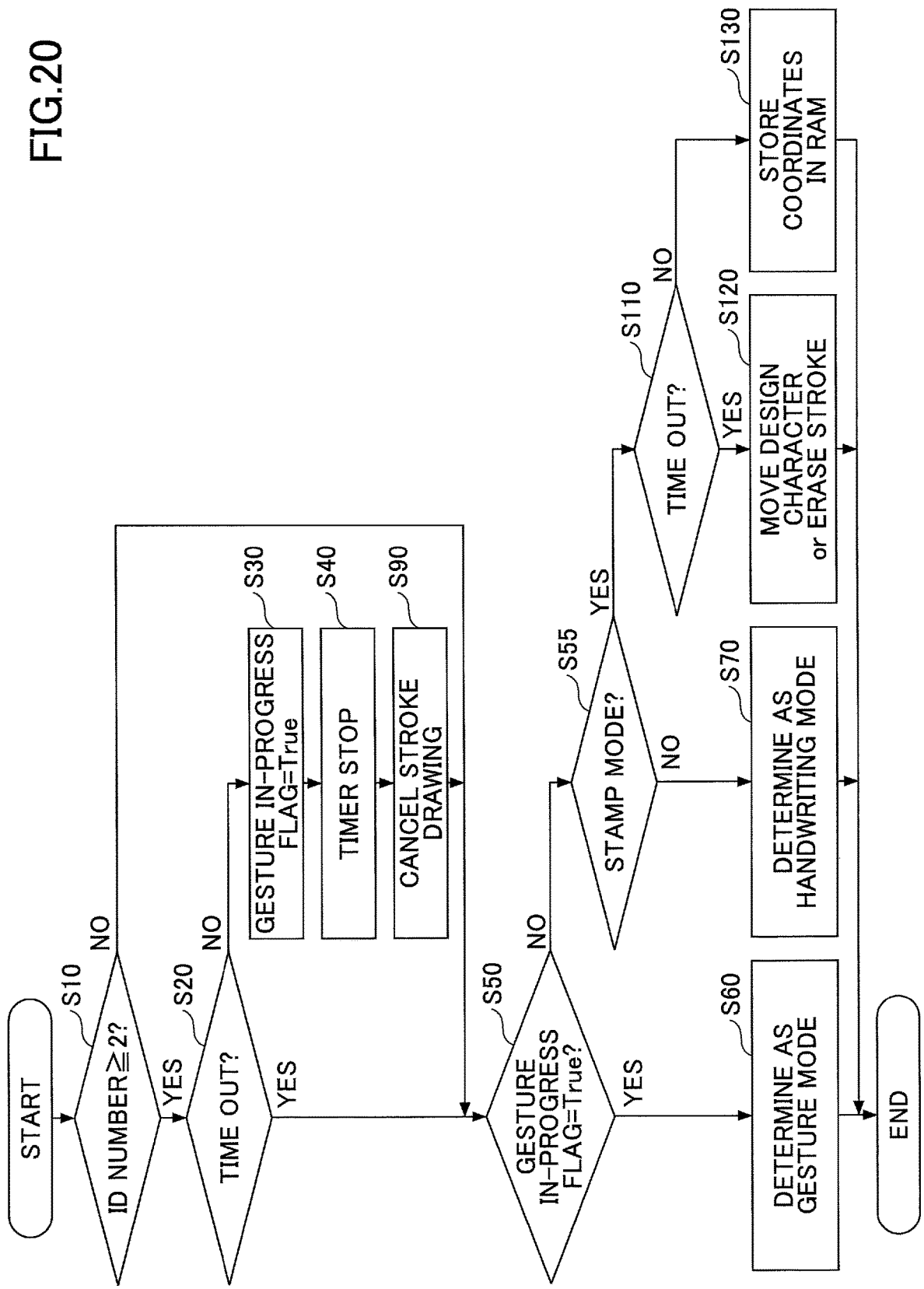
FIG. 20 is an example of a flowchart illustrating a process performed by a stroke processing unit when a touch move event is detected according to the third embodiment of the present invention.

FIG. 20 is an example of a flowchart illustrating a process performed by the stroke processing unit 32 when a touch move event is detected. Note that in FIG. 20, the difference from FIG. 16 according to the second embodiment will mainly be described.

When the mode determining unit 252 determines that the mode is not the gesture mode in step S50, the mode determining unit 252 determines whether the mode is the stamp mode (step S55).

When the mode is not the stamp mode (NO in S55), it has already been determined that the mode is not in the gesture mode, and therefore the mode determining unit 252 determines that the mode is the handwriting mode (step S70).

When the mode is the stamp mode (YES in S55), the mode determining unit 252 determines whether time out has occurred (step S110). This is because it is not determined whether the mode is the gesture mode until time out.

When the determination in step S110 is YES, the timer 255 has already timed out, and therefore the stroke processing unit 32 displays the design character 503 at the coordinates detected by the coordinate detecting unit 22, or erases a stroke at the coordinates detected by the coordinate detecting unit 22 (step S120). That is, FIG. 20 is a process of a touch move event, and therefore it means that the coordinates have changed, and the stroke processing unit 32 changes the position of the design character 503 already displayed, according to the coordinates. Alternatively, the stroke processing unit 32 erases the stroke according to the coordinates. Therefore, the electronic blackboard 2 can continue the process according to the stamp mode performed immediately after the time out.

When the determination in step S110 is NO, the timer 255 has not timed out, and therefore the mode determining unit 252 stores the coordinates in the RAM 103 (step S130). Therefore, when the electronic blackboard 2 times out, it is possible to perform a process according to the stamp mode based on the coordinates stored in the RAM 103.

As described above, also in the touch move event, an appropriate process can be performed according to the stamp mode depending on whether the time out has occurred.

<Touch Up Event>

Figure 21:
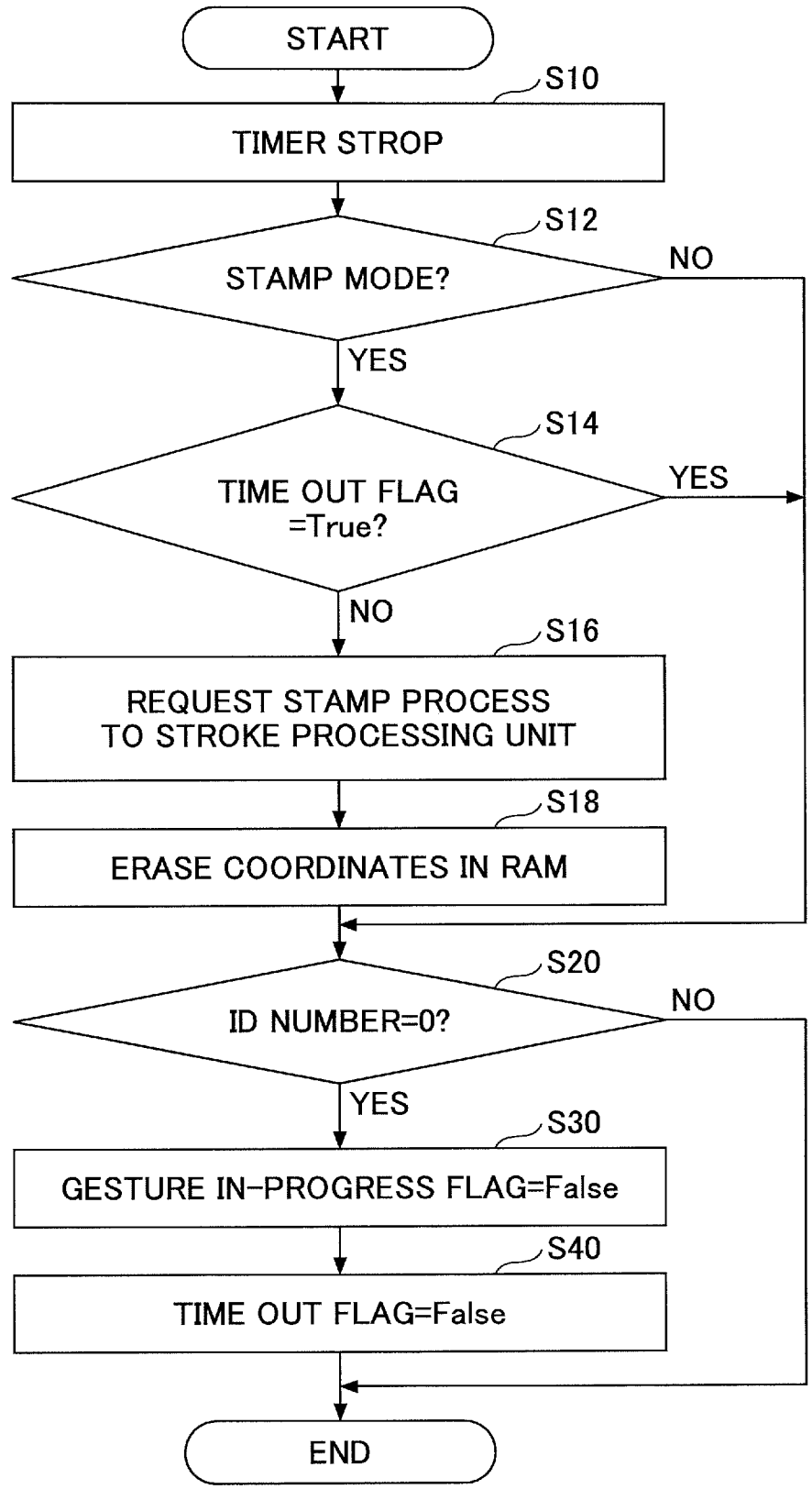
FIG. 21 is an example of a flowchart illustrating a process performed by the mode determining unit when a touch up event is detected according to the third embodiment of the present invention.

FIG. 21 is an example of a flowchart illustrating a process performed by the mode determining unit 252 when a touch up event is detected. In FIG. 21, the differences from FIG. 14 will mainly be described.

When the timer 255 is stopped in step S10, the mode determining unit 252 determines whether the mode is the stamp mode (step S12).

When the mode is not the stamp mode (NO in S12), the process proceeds to step S20 in the same manner as in the first embodiment.

When the mode is the stamp mode (YES in step S12), the mode determining unit 252 determines whether the time out flag 253 is set to True (step S14).

When the time out flag 253 is set to True, a process at time out according to the stamp mode is performed, so the process proceeds to step S20.

When the time out flag 253 is set to False, a process according to the stamp mode has not been performed, and therefore the mode determining unit 252 determines to erase the coordinates stored in the RAM 103 (step S16). This process is the same as step S90 in FIG. 16. Therefore, even if a touch up event is detected before time up, the electronic blackboard 2 can perform a process according to the stamp mode.

Then, the coordinates stored in the RAM 103 become unnecessary, and therefore the mode determining unit 252 erases the coordinates stored in the RAM 103 (step S18).

As described above, in addition to the effects of the first and second embodiments, the electronic blackboard 2 according to the present embodiment has an effect that when there is another mode in addition to the handwriting mode and the gesture mode, it is possible to perform a process according to the other mode in a manner that the user does not perceive a strange feeling.

Other Application Examples

The best modes for carrying out the present invention have been described above by embodiments; however, the present invention is not limited to the specific embodiments described herein, and variations and substitutions may be made without departing from the spirit and scope of the present invention.

For example, although the input mode of the electronic blackboard 2 has been described in the present embodiment, the present invention is also widely applicable to information processing apparatuses such as a tablet terminal, a smartphone, a Personal Digital Assistant (PDA), a personal computer (PC), a digital signage, and a game console, etc., that includes a touch panel and that can switch between a handwriting mode and a gesture mode.

Furthermore, the electronic blackboard 2 may be referred to as anything, such as an electronic information board or an electronic whiteboard.

Furthermore, in the present embodiment, an example in which the user performs the gesture operation mainly with two fingers has been described; however, the gesture operation may be performed with an artificial object that can perform a gesture operation, such as a finger of a prosthetic hand or a robot. The gesture operation may be performed with two electronic pens 4.

Furthermore, the operation mode in which one finger is used for the operation is not necessarily the handwriting mode, and the operation mode in which two or more fingers are used for the operation is not necessarily the gesture mode. For example, an operation mode in which a stroke image is scrolled with one finger, and an operation mode in which a bold line is drawn with two fingers, are conceivable.

Figure 4:
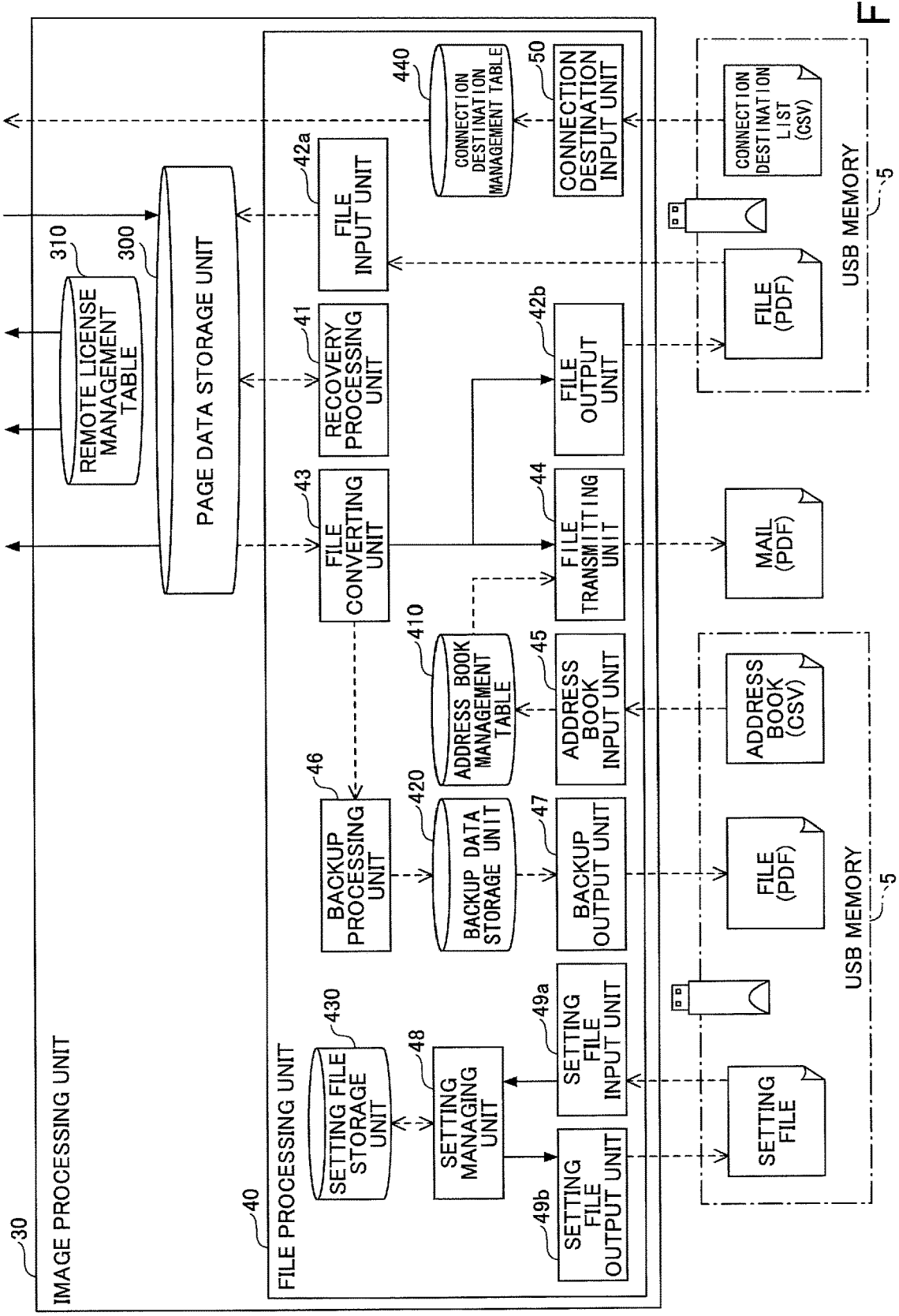
FIG. 4 is an example of a functional block diagram of a file processing unit according to an embodiment of the present invention.
Figure 5:
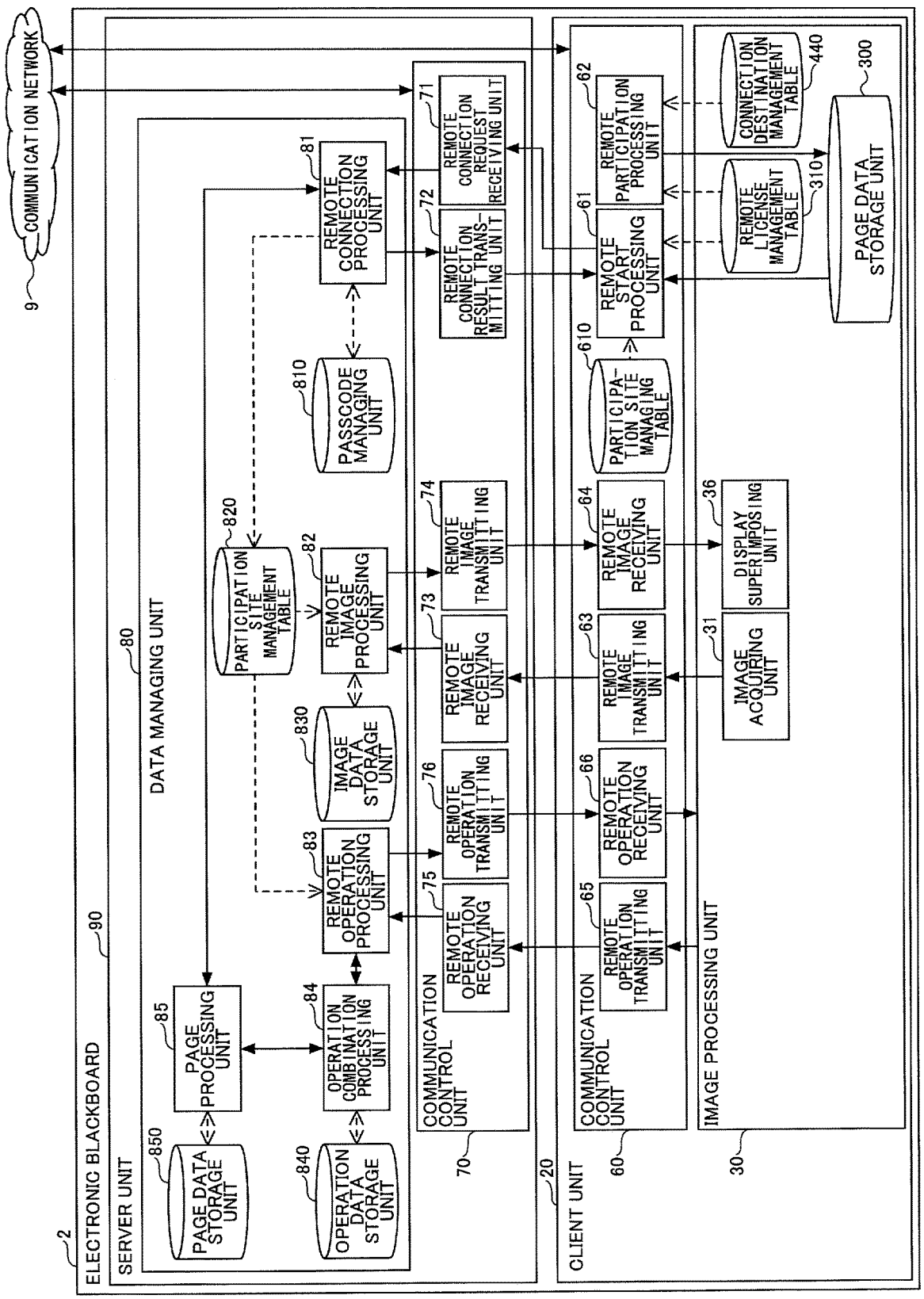
FIG. 5 is an example of a functional block diagram of a server unit 90 and a client unit according to an embodiment of the present invention.

Furthermore, the configuration examples of FIGS. 3 to 5 is divided according to the main functions to facilitate the understanding of processes by the electronic blackboard 2. The present invention is not limited by how the process units are divided or the names of the process units. The processes of the electronic blackboard 2 may be further divided into many process units according to the process contents. Furthermore, the process units may be divided such that a single process unit further includes many processes.

Note that the stroke image (B) is an example of visible information, the handwriting mode is an example of a first operation mode, and the gesture mode is an example a second operation mode. The coordinate detecting unit 22 is an example of a coordinate detector, the event assigning unit 25 is an example of a number detector, the timer 255 is an example of a time measurer, and the mode determining unit 252 is an example of a mode determiner. The stroke processing unit 32 is an example of an information displayer. The operation processing unit 26 is an example of a mode acceptor. The stamp mode is an example of a predetermined operation mode. The hand H or the electronic pen 4 is an example of an object. The time measured by the timer 255 is an example of a predetermined time. The process performed by the electronic blackboard 2 according to the present embodiment is an example of an information display method. The RAM 103 is an example of a storage.

According to one embodiment of the present invention, an electronic blackboard capable of appropriately determining the operation mode, can be provided.

The an electronic blackboard, the storage medium, and the information display method are not limited to the specific embodiments described in the detailed description, and variations and modifications may be made without departing from the spirit and scope of the present invention.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer program according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of a source code that comprises human-readable statements written in a programming language or a machine code that comprises numerical instructions recognizable by a suitable execution system such as a processor in a computer system or other systems. The machine code may be converted from the source code, etc. If embodied in hardware, each block may represent a circuit or a number of interconnected circuits to implement the specified logical function(s).

What is claimed is:

1. An electronic blackboard including a display configured to display visible information, the electronic blackboard comprising:
    a processor; and
    a memory storing program instructions that cause the processor to:
        detect coordinates of a plurality of objects in the display;
        detect a number of the plurality of objects in the display, based on the detected coordinates of the plurality of objects, and
        measure an elapse of a predetermined time in response to detecting a first object from among the plurality of objects, wherein the processor
            determines that the electronic blackboard operates in a handwriting mode, in which the visible information is displayed based on the detected coordinates, in response to determining that a second object from among the plurality of objects is not detected upon the elapse of the predetermined time while the first object is being detected,
            determines that the electronic blackboard operates in a gesture mode, in which an operation with respect to the visible information is accepted, in response to determining that the second object is detected before the predetermined time has elapsed while the first object is being detected,
            uses the detected coordinates for handwriting upon determining that the electronic blackboard operates in the handwriting mode, and uses the detected coordinates for accepting the operation of the gesture mode upon determining that the electronic blackboard operates in the gesture mode,
            provisionally determines that the electronic blackboard operates in the handwriting mode, in response to detecting the first object, and provisionally displays the visible information on the display, based on only the detected coordinates of the first object before the predetermined time has elapsed while the first object is being detected, and
            erase the visible information provisionally displayed on the display before the predetermined time has elapsed in response to determining that the second object is detected before the predetermined time has elapsed while the first object is being detected.

2. The electronic blackboard according to claim 1, wherein the program instructions further cause the processor to:
    store the detected coordinates of the first object in a storage in response to detecting the first object, and
    display the visible information on the display based on the detected coordinates stored in the storage, in response to determining that the second object is not detected upon the elapse of the predetermined time while the first object is being detected.

3. The electronic blackboard according to claim 1, wherein the program instructions further cause the processor to:
    accept an operation of a predetermined operation mode in which a process based on the coordinates of the first object is performed, and
    store the coordinates of the first object in a storage in response to determining that the first object is detected in a state where the operation of the predetermined operation, mode is accepted, but the processor does not perform the process based on the coordinates stored in the storage until the predetermined time has elapsed while the first object is being detected, and
    display the visible information on the display in response to determining that the first object is in a state where the operation of the predetermined operation mode is not accepted, based on the detected coordinates of the first object.

4. The electronic blackboard according to claim 3, wherein the program instructions further cause the processor to:
    continue storing the detected coordinates of the first object in the storage until the predetermined time has elapsed in response to determining that the second object has not been detected before the predetermined time has elapsed in a state where the operation of the predetermined operation mode is accepted.

5. The electronic blackboard according to claim 4, wherein the program instructions further cause the processor to:
    perform the process of the predetermined operation mode with respect to the coordinates of the first object stored in the storage, and erase the detected coordinates of the first object stored in the storage in response to the elapse of the predetermined time, in a state where the operation of the predetermined operation mode is accepted.

6. The electronic blackboard according to claim 5, wherein the program instructions further cause the processor to:
continue performing the process of the predetermined operation mode with respect to the detected coordinates of the first object upon the elapse of the predetermined time in response to determining that the second object has not been detected before the predetermined time has elapsed in a state where the operation of the predetermined operation mode is accepted.

7. The electronic blackboard according to claim 3, wherein the process of the predetermined operation mode includes
a process of displaying a symbol that is accepted by the processor, at the detected coordinates of the first object, or
a process of erasing the visible information displayed on the display.

8. The electronic blackboard according to claim 1, wherein the program instructions further cause the processor to:
accept an operation of a predetermined operation mode in which a process based on the detected coordinates of the first object is performed,
store the detected coordinates of the first object in a storage without performing the process based on the detected coordinates stored in the storage until the predetermined time has elapsed in response to determining that the first object has been detected in a state where the operation of the predetermined operation mode is accepted, and
display the visible information on the display based on the detected coordinates of the first object in response to determining that the first object has been detected in a state where the operation of the predetermined operation mode is not accepted.

9. The electronic blackboard according to claim 8, wherein the program instructions further cause the processor to:
continue storing the detected coordinates of the first object in the storage until the predetermined time has elapsed in response to determining that the second object has not been detected before the predetermined time has elapsed in a state where the operation of the predetermined operation mode is accepted.

10. The electronic blackboard according to claim 9, wherein the program instructions further cause the processor to:
perform the process of the predetermined operation mode with respect to the detected coordinates of the first object stored in the storage, and
erase the detected coordinates of the first object from the storage upon the elapse of the predetermined time in a state where the operation of the predetermined operation mode is accepted.

11. The electronic blackboard according to claim 10, wherein the program instructions further cause the processor to:
continue performing the process of the predetermined operation mode with respect to the detected coordinates of the first object upon the elapse of the predetermined time in response to determining that the second object has not been detected before the predetermined time has elapsed in a state where the operation of the predetermined operation mode is accepted.

12. A non-transitory computer-readable recording medium storing a program that causes a computer to execute a process performed in an electronic blackboard including a display configured to display visible information, the process comprising:
detecting coordinates of plurality of objects in the display;
detecting a number of the plurality of objects in the display, based on the detected coordinates of the plurality of objects;
measuring an elapse of a predetermined time in response to detecting a first object from among the plurality of objects;
determining that the electronic blackboard operates in a handwriting mode in which the visible information is displayed based on the coordinates, in response to determining that a second object from among the plurality of objects is not detected upon the elapse of the predetermined time while the first object is being detected;
determining that the electronic blackboard operates in a gesture mode in which an operation with respect to the visible information is accepted, in response to determining that the second object is detected before the predetermined time has elapsed while the first object is being detected;
using the detected coordinates for handwriting upon determining that the electronic blackboard operates in the handwriting mode, and the detected coordinates are used for accepting the operation of the gesture mode upon determining that the electronic blackboard operates in the gesture mode;
provisionally determining that the electronic blackboard operates in the handwriting mode, in response to detecting the first object, and provisionally displaying the visible information on the display, based on only the detected coordinates of the first object before the predetermined time has elapsed while the first object is being detected; and
erasing the visible information provisionally displayed on the display before the predetermined time has elapsed in response to determining that the second object is detected before the predetermined time has elapsed while the first object is being detected.

13. An information display method performed by an electronic blackboard including a display configured to display visible information, the information display method comprising:
detecting coordinates of plurality of objects in the display;
detecting a number of the plurality of objects in the display, based on the detected coordinates of the plurality of objects;
measuring an elapse of a predetermined time in response to detecting a first object from among the plurality of objects;
determining that the electronic blackboard operates in a handwriting mode in which the visible information is displayed based on the coordinates, in response to determining that a second object from among the plurality of objects is not detected upon the elapse of the predetermined time while the first object is being detected;
determining that the electronic blackboard operates in a gesture mode in which an operation with respect to the visible information is accepted, in response to determining that the second object is detected before the predetermined time has elapsed while the first object is being detected;

using the detected coordinates for handwriting upon determining that the electronic blackboard operates in the handwriting mode, and the detected coordinates are used for accepting the operation of the gesture mode upon determining that the electronic blackboard operates in the gesture mode;

provisionally determining that the electronic blackboard operates in the handwriting mode, in response to detecting the first object, and provisionally displaying the visible information on the display, based on only the detected coordinates of the first object before the predetermined time has elapsed while the first object is being detected; and erasing the visible information provisionally displayed on the display before the predetermined time has elapsed in response to determining that the second object is detected before the predetermined time has elapsed while the first object is being detected.

\* \* \* \* \*